United States Patent
Roh et al.

(10) Patent No.: US 10,517,000 B2
(45) Date of Patent: Dec. 24, 2019

(54) APPARATUS AND METHOD FOR PERFORMING BEAMFORMING OPERATION IN MILLIMETER WAVE COMMUNICATION SYSTEM

(71) Applicant: Samsung Electronics Co., Ltd., Suwon-si, Gyeonggi-do (KR)

(72) Inventors: Dong-Hwi Roh, Seoul (KR); Ohyun Jo, Seoul (KR); Sung-Rok Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 15/293,911

(22) Filed: Oct. 14, 2016

(65) Prior Publication Data

US 2017/0111806 A1    Apr. 20, 2017

(30) Foreign Application Priority Data

Oct. 16, 2015   (KR) .................. 10-2015-0144801

(51) Int. Cl.
*H04W 16/28* (2009.01)
*H04W 72/04* (2009.01)

(52) U.S. Cl.
CPC ......... *H04W 16/28* (2013.01); *H04W 72/042* (2013.01); *H04W 72/0413* (2013.01)

(58) Field of Classification Search
CPC .............................. H04W 16/28; H01Q 3/00
USPC ........................................................ 370/329
See application file for complete search history.

(56) References Cited

U.S. PATENT DOCUMENTS

| | | | |
|---|---|---|---|
| 8,625,565 B2 | 1/2014 | Cordeiro et al. | |
| 2010/0215027 A1 | 8/2010 | Liu et al. | |
| 2013/0044695 A1 | 2/2013 | Xu et al. | |
| 2013/0315325 A1 | 11/2013 | Wang et al. | |
| 2013/0329712 A1 | 12/2013 | Cordeiro et al. | |
| 2015/0049744 A1 | 2/2015 | Liu et al. | |
| 2015/0146812 A1* | 5/2015 | Chu | H04B 7/0417 375/267 |
| 2015/0244432 A1 | 8/2015 | Wang | |

OTHER PUBLICATIONS

Cordeiro; Alignment of DMG field definition; doc: IEEE 802.11-14/1109r2; Sep. 16, 2014.

* cited by examiner

*Primary Examiner* — Samina F Choudhry
(74) *Attorney, Agent, or Firm* — Jefferson IP Law, LLP

(57) ABSTRACT

An apparatus and a method for performing a beamforming operation in an access point (AP) in a millimeter Wave (mmWave) communication system are provided. The method includes transmitting a directional reference signal (RS) in an RS transmission (Tx) interval, and transmitting a training signal in an interval different from an interval during which the directional RS is transmitted in the RS Tx interval based on beamforming patterns supported in the AP, wherein a length of the training signal is shorter than a length of the directional RS. The apparatus and the method relate to a pre-5th-generation (5G) or 5G communication system to be provided for supporting higher data rates beyond 4th-generation (4G) communication system such as a long term evolution (LTE).

18 Claims, 15 Drawing Sheets

APPARATUS AND METHOD FOR PERFORMING BEAMFORMING OPERATION IN MILLIMETER WAVE COMMUNICATION SYSTEM

CROSS-REFERENCE TO RELATED APPLICATION(S)

This application claims the benefit under 35 U.S.C. § 119(a) of a Korean patent application filed on Oct. 16, 2015 in the Korean Intellectual Property Office and assigned Serial number 10-2015-0144801, the entire disclosure of which is hereby incorporated by reference.

TECHNICAL FIELD

The present disclosure relates to an apparatus and method for performing a beamforming operation in a millimeter wave (mmWave) communication system.

BACKGROUND

To meet the demand for wireless data traffic, which has increased since the deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

In broadband carrier transmission which recently emerges as a 5G communication and uses a mmWave band, each transmission (Tx) antenna is used as an array antenna, so a beam gain may be acquired through radio frequency (RF) beamforming. In this case, a user equipment (UE) performs a beam sweeping process for each Tx antenna, and selects an optimal Tx antenna and an optimal Tx beam based on a result of the beam sweeping process.

An environment where there is a mismatch between uplink coverage and downlink coverage in a general mmWave communication system will be described with reference to FIG. 1.

FIG. 1 schematically illustrates an environment where there is a mismatch between uplink coverage and downlink coverage in a general mmWave communication system according to the related art.

Referring to FIG. 1, it will be assumed that the mmWave communication system is an institute of electrical and electronics engineers (IEEE) 802.11ad communication system.

Referring to FIG. 1, the mmWave communication system includes an access point (AP) 111, a plurality of stations (STAs), e.g., N STAs, e.g., an STA#1 113-1, an STA#2 113-2, . . . , an STA#2 113-N.

Referring to FIG. 1, it will be understood that output power of the AP 111, the STA#1 113-1, the STA#2 113-2, . . . , the STA#2 113-N are different. That is, it will be understood that the output power of the AP 111 is greater than the output power of each of the STA#1 113-1, the STA#2 113-2, . . . , the STA#2 113-N.

Link coverage varies according to the difference in the output power, so a mismatch among link coverage, i.e., downlink coverage of the AP 111 and link coverage, i.e., uplink coverage of the STA#1 113-1, the STA#2 113-2, . . . , the STA#2 113-N occurs.

An environment where there is a mismatch between uplink coverage and downlink coverage in a general mmWave communication system has been described with reference to FIG. 1, and a beamforming scheme performed in a general mmWave communication system will be described with reference to FIG. 2.

FIG. 2 schematically illustrates a beamforming scheme performed in a general mmWave communication system according to the related art.

Referring to FIG. 2, it will be assumed that the mmWave communication system is an IEEE 802.11ad communication system.

The mmWave communication system includes an AP 211 and an STA 213.

The AP 211 performs a beamforming operation without considering a location of the STA 213.

The AP 211 repetitively transmits the same packet, e.g., a beacon signal in various directions for Tx beamforming. The AP 211 repetitively transmits the beacon signal during a beacon transmission interval (BTI). In this case, an antenna direction of the STA 213 is quasi-omni-directional.

For Tx beamforming of the STA 213, the STA 213 repetitively transmits the same packet, e.g., a sector sweep (SSW) signal in various directions. The STA 213 repetitively transmits the SSW signal during an association beamforming training (A-BFT) interval. In this case, an antenna direction of the AP 211 is quasi-omni-directional. The AP 211 may transmit, to the STA 213, a sector sweep feedback (SSW-FB) signal to the SSW signal transmitted in the STA 213 within the A-BFT interval. The SSW-FB signal includes information related to an optimal reception (Rx) beam pattern which the AP 211 determines based on the SSW signals transmitted in the STA 213.

As described above, in a beamforming scheme performed in a general mmWave communication system, an AP and an STA perform a beamforming operation independently. So, an interval during which effective data is not transmitted increases, that is, an interval during which a beacon signal and an SSW signal are transmitted increases, and this increases network overhead.

Meanwhile, as illustrated in FIG. 1, in a case that a beamforming operation is performed in a general mmWave communication system, antenna Rx performance may decrease according to a direction of an Rx antenna, link coverage loss may occur due to the decrease in the antenna Rx performance.

In an IEEE 802.11ad communication system in which a scheduling operation is performed on a beacon interval (BI) basis, since the sum of time required for accepting service period request transmitted in an STA and the time which corresponds to a service period allocated by an AP is longer than the time which corresponds to the BI, and therefore, a relatively large network latency occurs.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for performing a beamforming operation in a millimeter wave (mmWave) communication system.

Another aspect of the present disclosure is to propose an apparatus and method for performing a beamforming operation based on link coverage in a mmWave communication system.

Another aspect of the present disclosure is to propose an apparatus and method for performing a beamforming operation based on network overhead in a mmWave communication system.

In accordance with an aspect of the present disclosure, a method for performing a beamforming operation in an access point (AP) in a millimeter Wave (mmWave) communication system is provided. The method includes transmitting an omni-directional reference signal (RS) in an RS transmission (Tx) interval, and transmitting a training signal in an interval different from an interval during which the omni-directional RS is transmitted in the RS Tx interval based on beamforming patterns supported in the AP, wherein a length of the training signal is shorter than a length of the omni-directional RS.

In accordance with another aspect of the present disclosure, a method for performing a beamforming operation in an AP in a mmWave communication system is provided. The method includes transmitting a directional reference signal (RS) in an RS transmission (Tx) interval based on beamforming patterns supported in the AP, and transmitting a training signal in an interval different from an interval during which the directional RS is transmitted in the RS Tx interval based on beamforming patterns supported in the AP, wherein a length of the training signal is shorter than a length of the directional RS.

In accordance with still another aspect of the present disclosure, a method for performing a beamforming operation in a station (STA) in a mmWave communication system is provided. The method includes receiving an omni-directional reference signal (RS) in an RS Tx interval, and receiving a training signal in an interval different from an interval during which the omni-directional RS is received in the RS Tx interval based on beamforming patterns supported in the STA, wherein a length of the training signal is shorter than a length of the omni-directional RS.

In accordance with various embodiments of the present disclosure, a method for performing a beamforming operation in a station (STA) in a millimeter Wave (mmWave) communication system is provided. The method includes receiving a directional reference signal (RS) in an RS transmission (Tx) interval, and receiving a training signal in an interval different from an interval during which the directional RS is received in the RS Tx interval based on beamforming patterns supported in the STA, wherein a length of the training signal is shorter than a length of the directional RS.

In accordance with still another aspect of the present disclosure, an access point (AP) in a mmWave communication system is provided. The AP includes a transmitter configured to perform an operation of transmitting an omni-directional reference signal (RS) in an RS Tx interval, and perform an operation of transmitting a training signal in an interval different from an interval during which the omni-directional RS is transmitted in the RS Tx interval based on beamforming patterns supported in the AP, wherein a length of the training signal is shorter than a length of the omni-directional RS.

In accordance with various embodiments of the present disclosure, an AP in a mmWave communication system is provided. The AP includes a transmitter configured to perform an operation of transmitting a directional reference signal (RS) in an RS Tx interval based on beamforming patterns supported in the AP, and an operation of transmitting a training signal in an interval different from an interval during which the directional RS is transmitted in the RS Tx interval based on beamforming patterns supported in the AP, wherein a length of the training signal is shorter than a length of the directional RS.

In accordance with still another aspect of the present disclosure, a STA in a mmWave communication system is provided. The STA includes a receiver configured to perform an operation of receiving an omni-directional RS in an RS Tx interval, and perform an operation of receiving a training signal in an interval different from an interval during which the omni-directional RS is received in the RS Tx interval based on beamforming patterns supported in the STA, wherein a length of the training signal is shorter than a length of the omni-directional RS.

In accordance with various embodiments of the present disclosure, a station (STA) in a millimeter Wave (mmWave) communication system is provided. The STA includes a receiver configured to perform an operation of receiving a directional reference signal (RS) in an RS transmission (Tx) interval, and an operation of receiving a training signal in an interval different from an interval during which the directional RS is received in the RS Tx interval based on beamforming patterns supported in the STA, wherein a length of the training signal is shorter than a length of the directional RS.

In accordance with various embodiments of the present disclosure, a non-transitory computer-readable recording medium is provided. The non-transitory computer-readable recording medium have recorded thereon at least one program comprising commands, which when executed by a computer, performs a method for performing a beamforming operation in an access point (AP) in a millimeter Wave (mmWave) communication system, the method comprising: transmitting a directional reference signal (RS) in an RS transmission (Tx) interval based on beamforming patterns supported in the AP; and transmitting a training signal in an interval different from an interval during which the directional RS is transmitted in the RS Tx interval based on the beamforming patterns supported in the AP, wherein a length of the training signal is shorter than a length of the directional RS.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 schematically illustrates an example of an operating process of an AP and an STA during an extended-beacon transmission interval (Ext-BTI) in FIG. 3 according to an embodiment of the present disclosure;

FIG. 9 schematically illustrates an example of an AP transmission (Tx) beam training operating process, an operating process of an AP, and an extended-association beamforming training (Ext-A-BFT) interval operating process during an Ext-BTI in FIG. 3 according to an embodiment of the present disclosure;

Throughout the drawings, it should be noted that like reference numbers are used to depict the same or similar elements, features, and structures.

DETAILED DESCRIPTION

Figure 1:
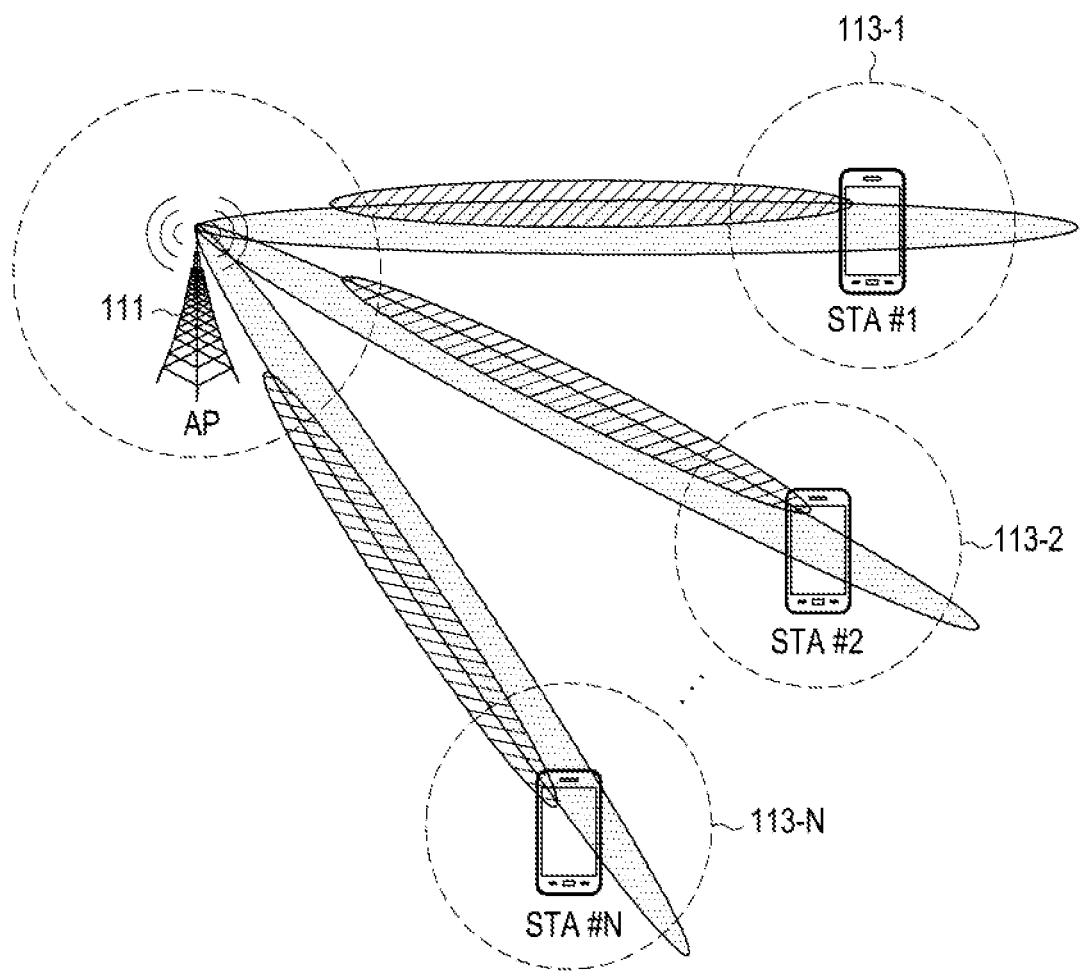
FIG. 1 schematically illustrates an environment where there is a mismatch between uplink coverage and downlink coverage in a general mmWave communication system according to the related art.
Figure 2:
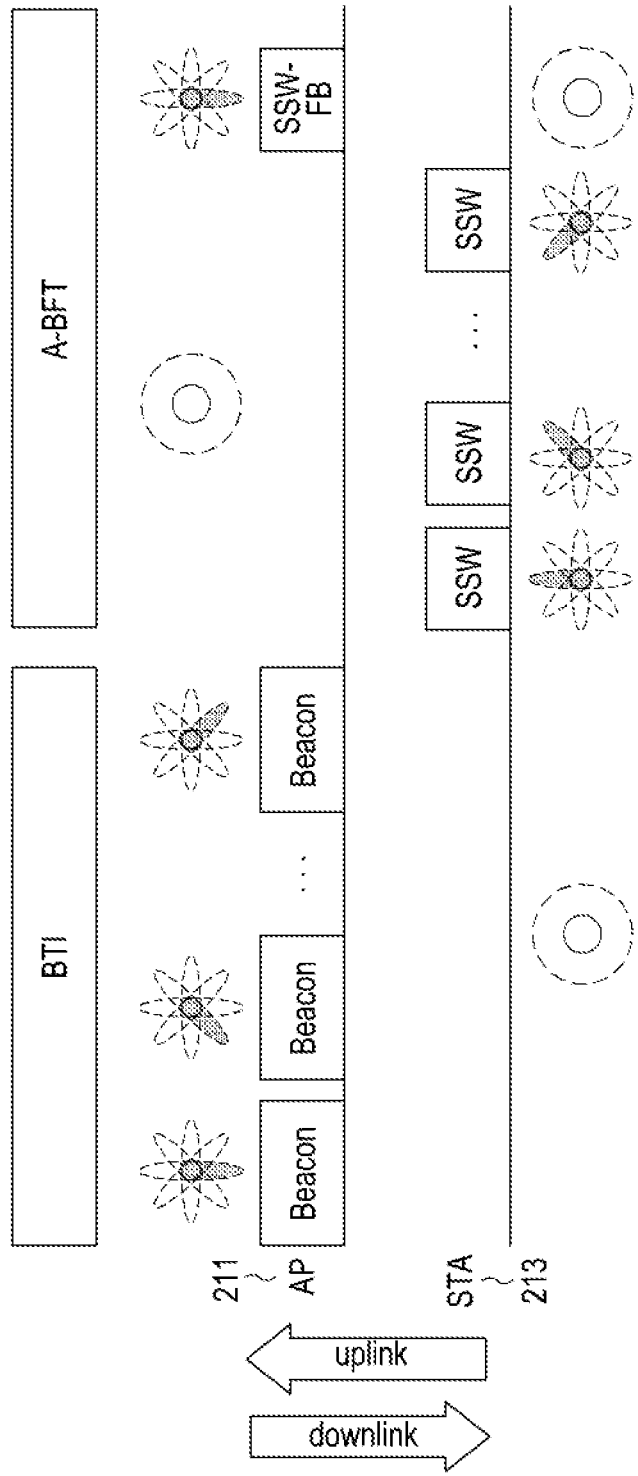
FIG. 2 schematically illustrates a beamforming scheme performed in a general mmWave communication system according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an Moving Picture Experts Group phase 1 or phase 2 (MPEG-1 or MPEG-2) audio layer 3 (mp3) player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital versatile disc (DVD) player, an audio, a refrigerator, an air conditioner, a vacuum cleaner, an oven, a microwave oven, a washer, a dryer, an air purifier, a set-top box, a television (TV) box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a station (STA) may be an electronic device.

According to various embodiments of the present disclosure, an STA may be a signal transmitting apparatus or a signal receiving apparatus, and an access point (AP) may be a signal transmitting apparatus or a signal receiving apparatus.

In various embodiments of the present disclosure, it will be noted that the term STA may be interchangeable with the term mobile station (MS), wireless terminal, mobile device, user equipment (UE), and/or the like.

In various embodiments of the present disclosure, it will be noted that the term AP may be interchangeable with the term evolved node B (eNB), base station (BS), and/or the like.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system, and/or the like.

In a beamforming scheme performed in a general millimeter wave (mmWave) communication system, each of an AP and an STA performs a beamforming operation. Since each of the AP and the STA performs the beamforming operation, an interval during which effective data is not transmitted becomes longer, that is, an interval during which a beacon signal and a sector sweep (SSW) signal are transmitted becomes longer, and this increases network overhead. Here, a beacon signal may be an example of a reference signal (RS).

This network overhead related to beamforming increases in a case that (1) a beamforming period becomes shorter, (2) the number of beams supported in an AP and an STA becomes increased, and (3) the number of STAs that accesses an AP becomes increased.

This network overhead due to beamforming may decrease network throughput.

An embodiment of the present disclosure provides an apparatus and method for performing a beamforming operation in a mmWave communication system.

An embodiment of the present disclosure provides an apparatus and method for performing a beamforming operation based on link coverage in a mmWave communication system.

An embodiment of the present disclosure provides an apparatus and method for performing a beamforming operation based on network overhead in a mmWave communication system.

An example of a process of performing a beamforming operation in a mmWave communication system according to an embodiment of the present disclosure will be described with reference to FIG. 3.

Figure 3:
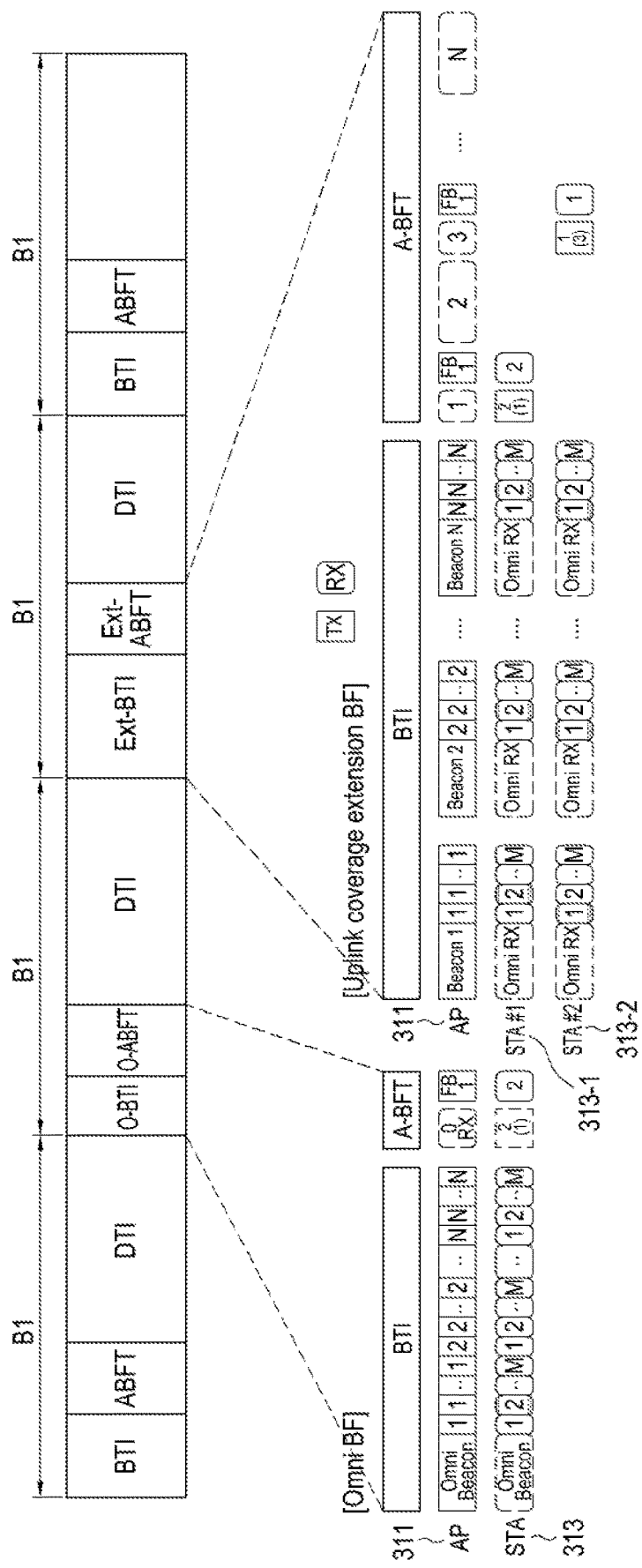
FIG. 3 schematically illustrates an example of a process of performing a beamforming operation in a mmWave communication system according to an embodiment of the present disclosure.

FIG. 3 schematically illustrates an example of a process of performing a beamforming operation in a mmWave communication system according to an embodiment of the present disclosure.

Referring to FIG. 3, it will be assumed that the mmWave communication system is, for example, an IEEE 802.11ad communication system, and this is only an example for convenience of description and should not limit a scope of the present disclosure.

The mmWave communication system includes an AP 311, a plurality of STAs, e.g., two STAs, e.g., an STA#1 313-1 and an STA#2 313-2.

The AP 311, the STA#1 313-1, and the STA#2 313-2 perform a beamforming operation based on a beacon interval (BI). An embodiment of the present disclosure proposes a new beamforming procedure and frame structure that enables to save transmission (Tx) power and decrease network overhead by varying a beamforming scheme per link coverage.

That is, in an embodiment of the present disclosure, with reference to FIG. 3, when the AP 311 performs a Tx beam searching operation, STAs, i.e., the STA#1 313-1 and the STA#2 313-2 may perform a reception (Rx) beam searching operation, and thus, the time required for performing Rx beam searching operation in STAs may be significantly decreased. In an embodiment of the present disclosure, an AP may perform an Rx beam searching operation after setting an optimal Rx beam of an STA for the AP which the STA determines based on a channel reciprocity theory as an optimal Tx beam of the AP for the STA, so uplink coverage may be enhanced.

As illustrated in FIG. 3, in a mmWave communication system according to an embodiment of the present disclosure, the AP 311 operates a beacon transmission interval (BTI), an association beamforming training (A-BFT) interval, and a data transfer interval (DTI) during a BI when performing a normal beamforming operation. The BTI, the A-BFT interval, and the DTI are the same as a general IEEE 802.11ad communication system, and thus, a detailed description thereof will be omitted herein.

In a mmWave communication system according to an embodiment of the present disclosure, the AP 311 may differently operate a BI in order for the STA#1 113-1 to perform an Rx beam searching operation when performing a Tx beam searching operation, compared to a case that the AP 311 performs a general normal beamforming operation, and this will be described below.

The AP 311 operates an omni-directional-beacon transmission interval (O-BTI), an omni-directional-association beamforming training (O-A-BFT) interval, and a DTI. The O-BTI and the O-A-BFT interval are newly proposed in an embodiment of the present disclosure, and they will be described below.

The AP 311 transmits a beacon signal omni-directionally during the O-BTI, and repetitively transmits a training sequence corresponding to a preset count based on each of a plurality of beam patterns, e.g., N beam patterns supported in the AP 311. The training sequence has a length shorter than a length of the beacon signal, the length of the training sequence may be determined based on various parameters used in the mmWave communication system, and a detailed description thereof will be omitted herein.

During the O-BTI, the STA#1 313-1 receives a beacon signal omni-directionally and receives a training sequence from the AP 311 based on each of a plurality of beam patterns, e.g., M beam patterns supported in the STA#1 313-1. During the O-BTI, the STA#1 313-1 selects an optimal Rx beam pattern based on the beacon signal and the training sequences. In FIG. 3, it will be assumed that the STA#1 313-1 selects an Rx beam pattern #2 as an optimal Rx beam pattern of the STA#1 313-1 for the AP 311, and selects a Tx beam pattern #1 as an optimal Tx beam pattern of the STA#1 313-1 for the AP 311. Here, the optimal Rx beam pattern of the STA#1 313-1 may be determined as an optimal Tx beam pattern of the STA#1 313-1 based on a channel reciprocity theory.

During the O-A-BFT interval, with reference to FIG. 3, the AP 311 sets an antenna direction to an omni-direction and performs an Rx operation. During the O-A-BFT interval, the STA#1 313-1 transmits a response signal including information related to the selected optimal Tx beam pattern of the AP 311, i.e., a Tx beam pattern #1 based on the selected optional Tx beam pattern, i.e., a Tx beam pattern #2. The AP 311 determines an optimal Tx beam pattern of the AP 311 for the STA#1 313-1 based on the information related to the optimal Tx beam pattern of the STA#1 313-1 included in the response signal. So, the AP 311 may transmit, to the STA#1 313-1, a feedback (FB) signal to the response signal transmitted in the STA#1 313-1 based on the optimal Tx beam pattern of the AP 311 for the STA#1 313-1 within the O-A-BFT interval.

Within the O-A-BFT interval, the STA#1 313-1 receives the FB signal transmitted in the AP 311 based on an optimal Rx beam pattern, i.e., an Rx beam pattern #2.

During the beacon interval (BI), the AP 311 operates an extended-beacon transmission interval (Ext-BTI), an extended-association beamforming training (Ext-A-BFT) interval, and a DTI. The Ext-BTI and the Ext-A-BFT interval are newly proposed in an embodiment of the present disclosure, and these will be described below.

During the Ext-BTI, the AP 311 transmits a beacon signal once for each of N Tx beam patterns supported in the AP 311, and repetitively transmits a training sequence corresponding to a preset count after transmitting the beacon signal.

During the Ext-BTI, the STA#1 313-1 receives a beacon signal omni-directionally, and receives a training sequence from the AP 311 based on each of M RX beam patterns supported in the STA#1 313-1. During the Ext-BTI, the STA#1 313-1 selects an optimal Rx beam pattern based on the beacon signal and the training sequences. In FIG. 3, it will be assumed that the STA#1 313-1 selects an Rx beam pattern #2 as an optimal Rx beam pattern of the STA#1 313-1 for the AP 311, and selects a Tx beam pattern #1 as an optimal Tx beam pattern of the AP 311 for the STA#1 313-1. Here, the optimal Rx beam pattern of the STA#1 313-1 may be determined as an optimal Tx beam pattern of the STA#1 313-1 based on a channel reciprocity theory.

During the Ext-BTI, the STA#2 313-2 receives a beacon signal omni-directionally, and receives a training sequence from the AP 311 based on each of M RX beam patterns supported in the STA#2 313-2. During the Ext-BTI, the STA#2 313-2 selects an optimal Rx beam pattern based on the beacon signal and the training sequences. In FIG. 3, it will be assumed that the STA#2 313-2 selects an Rx beam pattern #1 as an optimal Rx beam pattern of the STA#2

313-2 for the AP 311, and selects a Tx beam pattern #3 as an optimal Tx beam pattern of the AP 311 for the STA#2 313-2. Here, the optimal Rx beam pattern of the STA#2 313-2 may be determined as an optimal Tx beam pattern of the STA#2 313-2 based on a channel reciprocity theory.

During the Ext-A-BFT interval, the AP 311 performs an RX operation based on each of Rx beam patterns supported in the AP 311.

During the Ext-A-BFT interval, the STA#1 313-1 transmits a response signal including information related to the selected optimal Tx beam pattern of the AP 311, i.e., the Tx beam pattern #1 based on the selected optional Tx beam pattern, i.e., the Tx beam pattern #2. The AP 311 determines an optimal Tx beam pattern of the AP 311 for the STA#1 313-1 based on the information related to the optimal Tx beam pattern of the AP 311 included in the response signal. So, the AP 311 may transmit, to the STA#1 313-1, a FB signal to the response signal transmitted in the STA#1 313-1 based on the optimal Tx beam pattern of the AP 311 for the STA#1 313-1 within the Ext-A-BFT interval.

Within the Ext-A-BFT interval, the STA#1 313-1 receives the FB signal transmitted in the AP 311 based on an optimal Rx beam pattern, i.e., an Rx beam pattern #2.

During the Ext-A-BFT interval, the STA#2 313-2 transmits a response signal including information related to the selected optimal Tx beam pattern of the AP 311, i.e., a Tx beam pattern #3 based on the selected optional Tx beam pattern, i.e., a Tx beam pattern #1. The AP 311 determines an optimal Tx beam pattern of the AP 311 for the STA#2 313-2 based on the information related to the optimal Tx beam pattern of the AP 311 included in the response signal. So, the AP 311 may transmit, to the STA#2 313-2, a FB signal to the response signal transmitted in the STA#2 313-2 based on the optimal Tx beam pattern of the AP 311 for the STA#2 313-2 within the Ext-A-BFT interval.

Within the Ext-A-BFT interval, the STA#1 313-1 receives the FB signal transmitted in the AP 311 based on an optimal Rx beam pattern, i.e., an Rx beam pattern #1.

An example of a process of performing a beamforming operation in a mmWave communication system according to an embodiment of the present disclosure has been described with reference to FIG. 3, and an example of an operating process of an STA in a mmWave communication system according to an embodiment of the present disclosure will be described with reference to FIG. 4.

Figure 4:
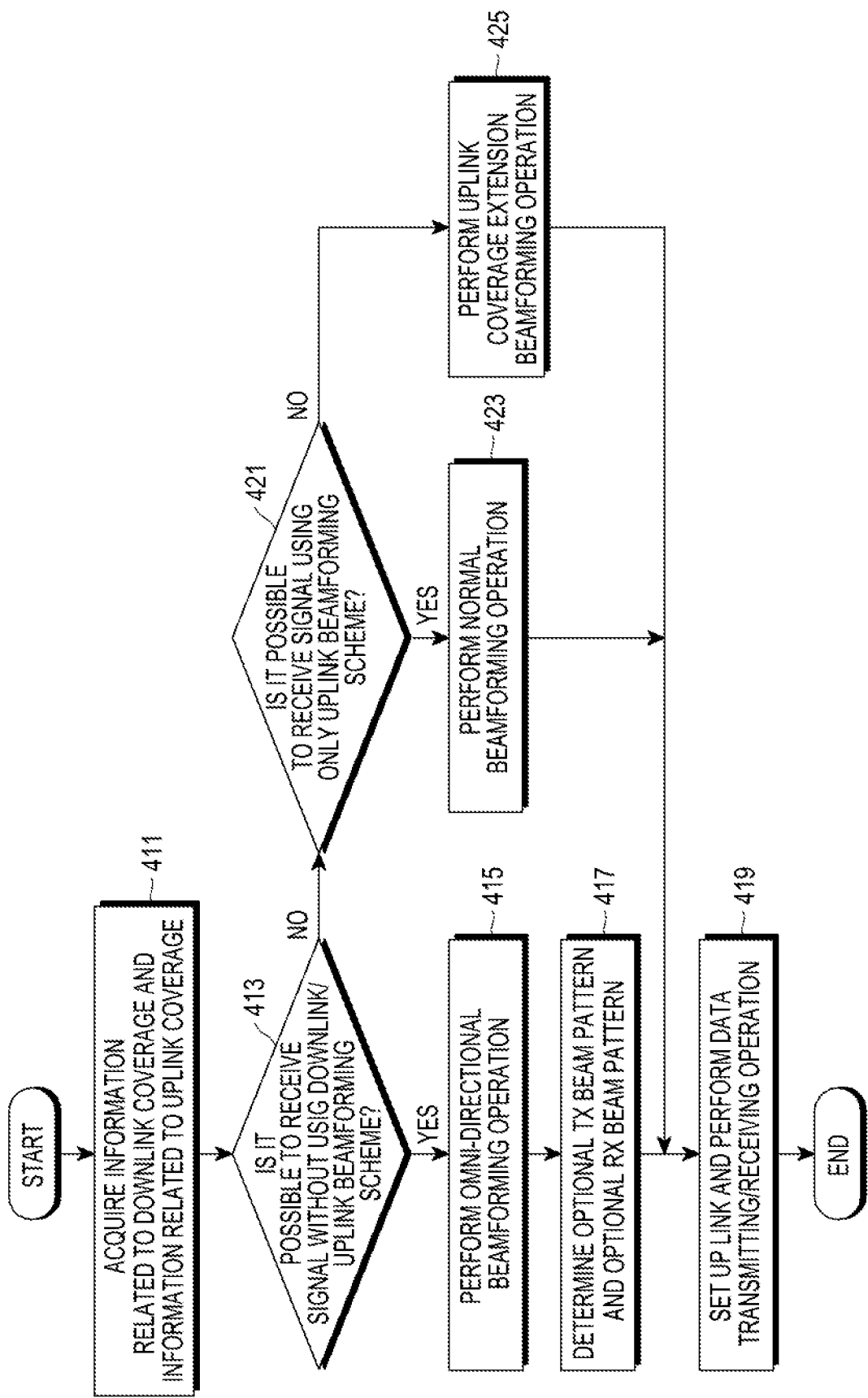
FIG. 4 schematically illustrates an example of an operating process of a station (STA) in a mmWave communication system according to an embodiment of the present disclosure.

FIG. 4 schematically illustrates an example of an operating process of an STA in a mmWave communication system according to an embodiment of the present disclosure.

Referring to FIG. 4, an STA acquires information related to downlink coverage and information related to uplink coverage based on strength of a signal received from an AP, a beam direction, Tx output strength information of the AP, Tx antenna gain (TX ANT GAIN) information of the AP, and Rx antenna gain (RX ANT GAIN) information of the STA at operation 411. The AP transmits a beacon signal including the Tx output strength information of the AP, the TX ANT GAIN information of the AP, and the RX ANT GAIN information of the AP in order to the STA to acquire the information related to the downlink coverage and the information related to the uplink coverage. The AP may transmit the Tx ANT GAIN information and the RX ANT GAIN information through a signal other than the beacon signal, e.g., a pilot signal.

Meanwhile, the STA compares a Tx environment of the STA with a coverage capability based on the acquired information related to the downlink coverage and information related to the uplink coverage. The STA performs a beamforming operation based on the compared result, and this will be described below.

The STA determines whether it is possible to receive a signal without using a downlink/uplink beamforming scheme at operation 413. If it is possible to receive the signal without using the downlink/uplink beamforming scheme, the STA performs a beamforming operation which is based on an omni-directional beamforming scheme at operation 415. That is, the STA performs the beamforming operation which is based on the omni-directional beamforming scheme for each of a downlink and an uplink at operation 415. For example, the omni-directional beamforming scheme is used for optimizing network overhead for an inner cell-STA.

The STA determines an optimal Tx beam pattern and an optimal Rx beam pattern based on the result of the beamforming operation which is based on the omni-directional beamforming scheme at operation 417. The STA sets up a link based on the determined optimal Tx beam pattern and optimal Rx beam pattern and performs a data Tx/Rx operation at operation 419.

If it is impossible to receive the signal without using the downlink/uplink beamforming scheme, the STA determines whether it is possible to receive a signal using only an uplink beamforming scheme at operation 421. If it is possible to receive the signal using only the uplink beamforming scheme, the STA performs a beamforming operation based on a normal beamforming scheme at operation 423, and proceeds to operation 417. That is, the STA performs a beamforming operation based on an omni-directional beamforming scheme for a downlink, and performs a beamforming operation for an uplink based on a directional beamforming scheme at operation 423. For example, it may be preferable that the normal beamforming scheme is applied to an STA which is located at an area where normal signal transmitting/receiving is possible without considering an outdoor environment.

The STA determines an optimal Tx beam pattern and an optimal Rx beam pattern based on the result of the beamforming operation which is based on the normal beamforming scheme at operation 417, and proceeds to operation 419. The STA sets up a link based on the determined optimal Tx beam pattern and optimal Rx beam pattern and transmits/receives data at operation 419.

If it is impossible to receive the signal using only the uplink beamforming scheme, the STA proceeds to operation 425. The STA performs a beamforming operation which is based on an uplink coverage extension beamforming scheme at operation 425 since it is impossible to receive the signal using only the uplink beamforming scheme, and proceeds to operation 417. The uplink coverage extension beamforming scheme denotes a beamforming scheme as illustrated in FIG. 3. That is, the STA performs a beamforming operation for all of a downlink and an uplink based on a directional beamforming scheme at operation 425, and proceeds to operation 417. It may be preferable that the uplink coverage extension beamforming scheme is applied to an STA which troubles in a link access when performing a beamforming operation based on an omni-directional beamforming scheme or a normal beamforming scheme due to mismatch between downlink coverage and uplink coverage. That is, it may be preferable that the uplink coverage extension beamforming scheme is applied to an outer cell-STA. In this case, downlink coverage and uplink coverage of the outer cell-STA may be extended.

The STA determines an optimal Tx beam pattern and an optimal Rx beam pattern based on the result of the beamforming operation which is based on the uplink coverage extension beamforming scheme at operation 417, and proceeds to operation 419. The STA sets up a link based on the determined optimal Tx beam pattern and optimal Rx beam pattern and transmits/receives data at operation 419.

Although FIG. 4 illustrates an example of an operating process of an STA in a mmWave communication system according to an embodiment of the present disclosure, various changes could be made to FIG. 4. For example, although shown as a series of operations, various operations in FIG. 4 could overlap, occur in parallel, occur in a different order, or occur multiple times.

An example of an operating process of an STA in a mmWave communication system according to an embodiment of the present disclosure has been described with reference to FIG. 4, and a format of a beacon signal in a mmWave communication system according to an embodiment of the present disclosure will be described with reference to FIG. 5.

Figure 5:
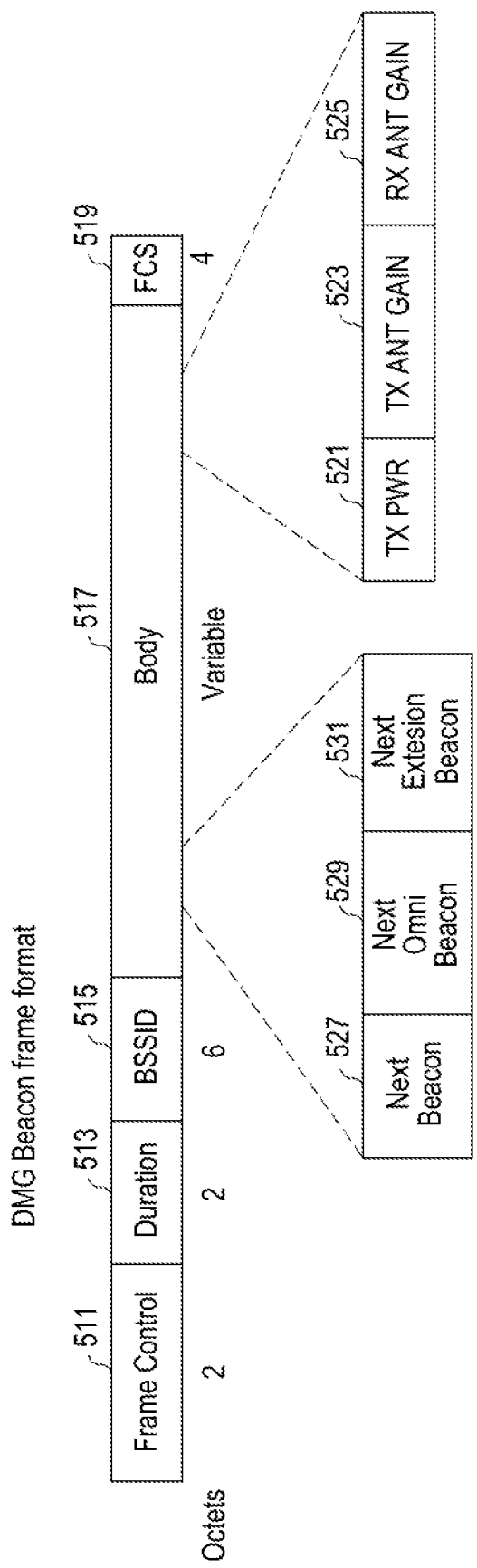
FIG. 5 schematically illustrates a format of a beacon signal in a mmWave communication system according to an embodiment of the present disclosure.

FIG. 5 schematically illustrates a format of a beacon signal in a mmWave communication system according to an embodiment of the present disclosure.

Referring to FIG. 5, as illustrated in FIG. 4, an AP needs to transmit TX ANT GAIN information and RX ANT GAIN information in order for an STA to acquire information related to downlink coverage and information related to uplink coverage. So, an embodiment of the present disclosure proposes that an AP includes Tx output strength information, TX ANT GAIN information of the AP, and RX ANT GAIN information of the AP into a beacon signal to transmit the beacon signal. A format of the beacon signal proposed in an embodiment of the present disclosure will be described below.

The beacon signal includes a frame control field 511, a duration field 513, a basic service set identifier (BSSID) field 515, a body field 517, and a frame check sequence (FCS) field 519. For example, the frame control field 511 may be implemented with 2 octets, the duration field 513 may be implemented with 2 octets, the BSSID field 515 may be implemented with 6 octets, the FCS field 519 may be implemented with 2 octets, and the body field 517 may be implemented with a variable length. The frame control field 511, the duration field 513, the BSSID field 515, and the FCS field 519 are the same as a frame control field, a duration field, a BSSID field, and an FCS field used in an IEEE 802.11 ad communication system, and a detailed description thereof will be omitted herein. The body field 517 includes a Tx power (TX PWR) field 521, a TX ANT GAIN field 523, and an RX ANT GAIN field 525.

For example, TX PWR strength information of the AP, TX ANT GAIN information of the AP, and RX ANT GAIN information of the AP are included in the body field 517. That is, the TX PWR strength information of the AP is included in the TX PWR field 521, the TX ANT GAIN information of the AP is included in the TX ANT GAIN field 523, and the RX ANT GAIN information of the AP is included in the RX ANT GAIN field 525.

The body field 517 may include fields indicating scheduling Tx information related to a BTI, and this will be described below.

The fields indicating the scheduling Tx information related to the BTI includes a next beacon field 527, a next omni-beacon field 529, and a next extension beacon field 531.

The next beacon field 527 indicates the number of BIs next to a current BI during which a directional band (DBand) beacon signal will not be present.

The next omni-beacon field 529 indicates the number of BIs next to a current BI during which a omni-directional band (OmiDBand) beacon signal will not be present.

The next extension beacon field 531 indicates the number of BIs next to a current BI during which an extended DBand beacon signal will not be present.

Locations of the fields as illustrated in FIG. 5 may be fixed or changed if necessary. At least two of the fields as illustrated in FIG. 5 may be incorporated into a single field.

A format of a beacon signal in a mmWave communication system according to an embodiment of the present disclosure has been described with reference to FIG. 5, and an example of an operating process of an AP in a mmWave communication system according to an embodiment of the present disclosure will be described with reference to FIG. 6.

Figure 6:
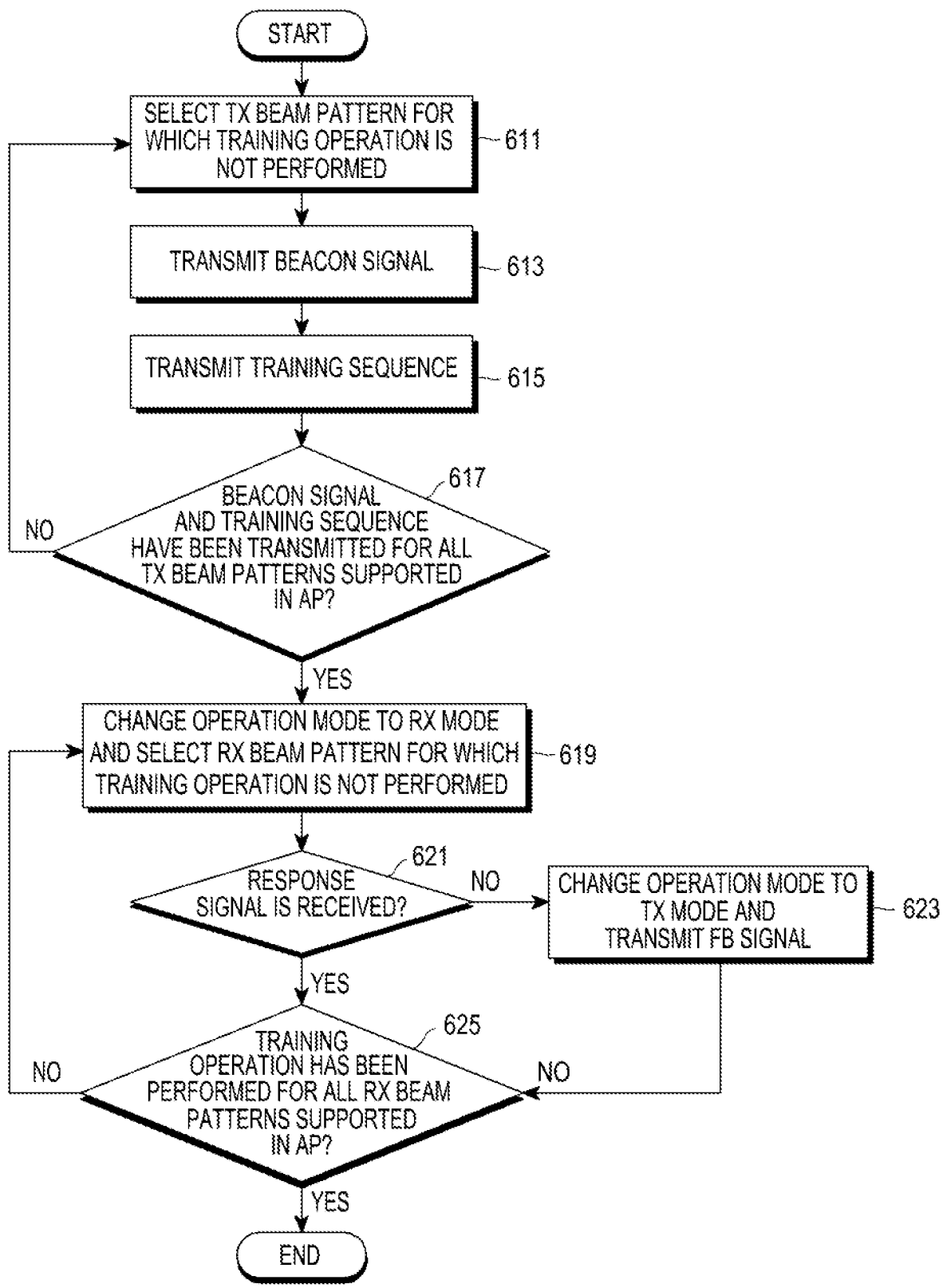
FIG. 6 schematically illustrates an example of an operating process of an access point (AP) in a mmWave communication system according to an embodiment of the present disclosure.

FIG. 6 schematically illustrates an example of an operating process of an AP in a mmWave communication system according to an embodiment of the present disclosure.

Referring to FIG. 6, it will be noted that an operating process of an AP in FIG. 6 is an operating process of an AP for searching a Tx beam pattern and an Rx beam pattern at the same time.

The AP selects a Tx beam pattern for which a training operation is not performed at operation 611. The AP transmits a beacon signal based on the selected Tx beam pattern at operation 613. The AP repetitively transmits a training sequence corresponding to a preset count based on the selected Tx beam pattern at operation 615. The AP determines whether a beacon signal and a training sequence have been transmitted for all Tx beam patterns supported in the AP at operation 617. If the beacon signal and the training sequence have not been transmitted for all of the Tx beam patterns supported in the AP, the AP proceeds to operation 611.

If the beacon signal and the training sequence have been transmitted for all of the Tx beam patterns supported in the AP, the AP changes an operation mode to an Rx mode and selects an Rx beam pattern for which a training operation is not performed at operation 619.

The AP determines whether a response signal is received from an STA at operation 621. If the response signal is received from the STA, the AP changes an operation mode to a Tx mode, determines an optional Tx beam pattern of the AP for the STA based on information about an optional Tx beam pattern of the AP for the STA included in the response signal, and transmits a FB signal based on the determined optional Tx beam pattern at operation 623.

If the response signal is not received from the STA, the AP determines whether a training operation has been performed for all Rx beam patterns supported in the AP at operation 625. If the training operation has not been performed for all of the Rx beam patterns supported in the AP, that is, if there is an Rx beam pattern for which a training operation will be performed, the AP proceeds to operation 619.

Although FIG. 6 illustrates an example of an operating process of an AP in a mmWave communication system according to an embodiment of the present disclosure, various changes could be made to FIG. 6. For example, although shown as a series of operations, various operations in FIG. 6 could overlap, occur in parallel, occur in a different order, or occur multiple times.

An example of an operating process of an AP in a mmWave communication system according to an embodiment of the present disclosure has been described with reference to FIG. 6, and another example of an operating process of an STA in a mmWave communication system according to an embodiment of the present disclosure will be described with reference to FIG. 7.

Figure 7:
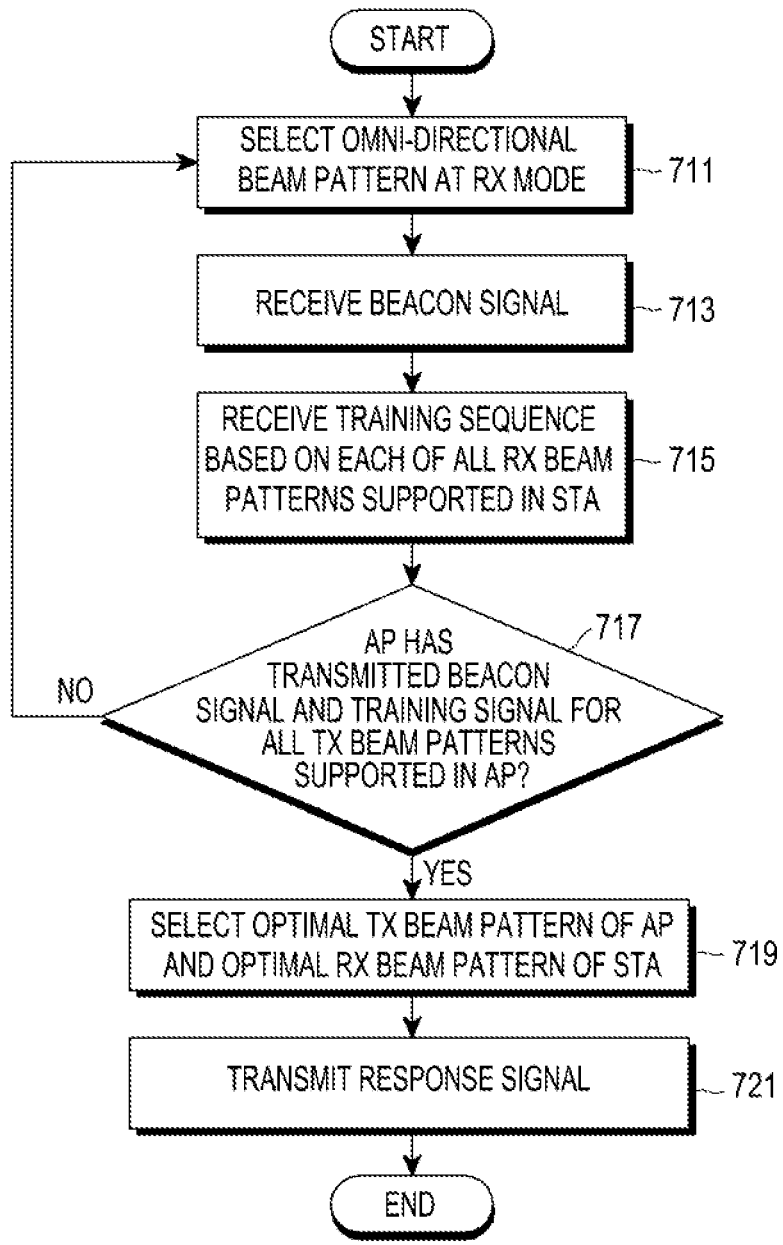
FIG. 7 schematically illustrates another example of an operating process of an STA in a mmWave communication system according to an embodiment of the present disclosure.

FIG. 7 schematically illustrates another example of an operating process of an STA in a mmWave communication system according to an embodiment of the present disclosure.

Referring to FIG. 7, it will be noted that an operating process of an STA in FIG. 7 is an operating process of an STA for searching a Tx beam pattern and an Rx beam pattern at the same time.

The STA selects an omni-directional beam pattern in an Rx mode at operation 711. The STA receives a beacon signal from an AP at operation 713. The STA receives a training sequence from the AP based on each of all Rx beam patterns supported in the STA at operation 715. The STA determines whether the AP has transmitted a beacon signal and a training signal for all Tx beam patterns supported in the AP at operation 717. If the AP has not transmitted the beacon signal and the training signal for all of the Tx beam patterns supported in the AP, the AP proceeds to operation 711.

If the AP has transmitted the beacon signal and the training signal for all of the Tx beam patterns supported in the AP, the AP selects a Tx beam pattern of the AP and an Rx beam pattern of the STA for which Rx performance is the best as an optimal Tx beam pattern of the AP and an optimal Rx beam pattern of the STA at operation 719. The STA transmits a response signal based on a Tx beam pattern identical to the optimal Rx beam pattern of the STA in an interval for which an Rx beam pattern of the AP is identical to the optimal Tx beam pattern of the AP at operation 721. The response signal includes information related to the optimal Tx beam pattern of the AP.

Although FIG. 7 illustrates another example of an operating process of an STA in a mmWave communication system according to an embodiment of the present disclosure, various changes could be made to FIG. 7. For example, although shown as a series of operations, various operations in FIG. 7 could overlap, occur in parallel, occur in a different order, or occur multiple times.

Another example of an operating process of an STA in a mmWave communication system according to an embodiment of the present disclosure has been described with reference to FIG. 7, and an example of an operating process of an AP and an STA during an Ext-BTI in FIG. 3 will be described with reference to FIG. 8.

Figures 8, 9:
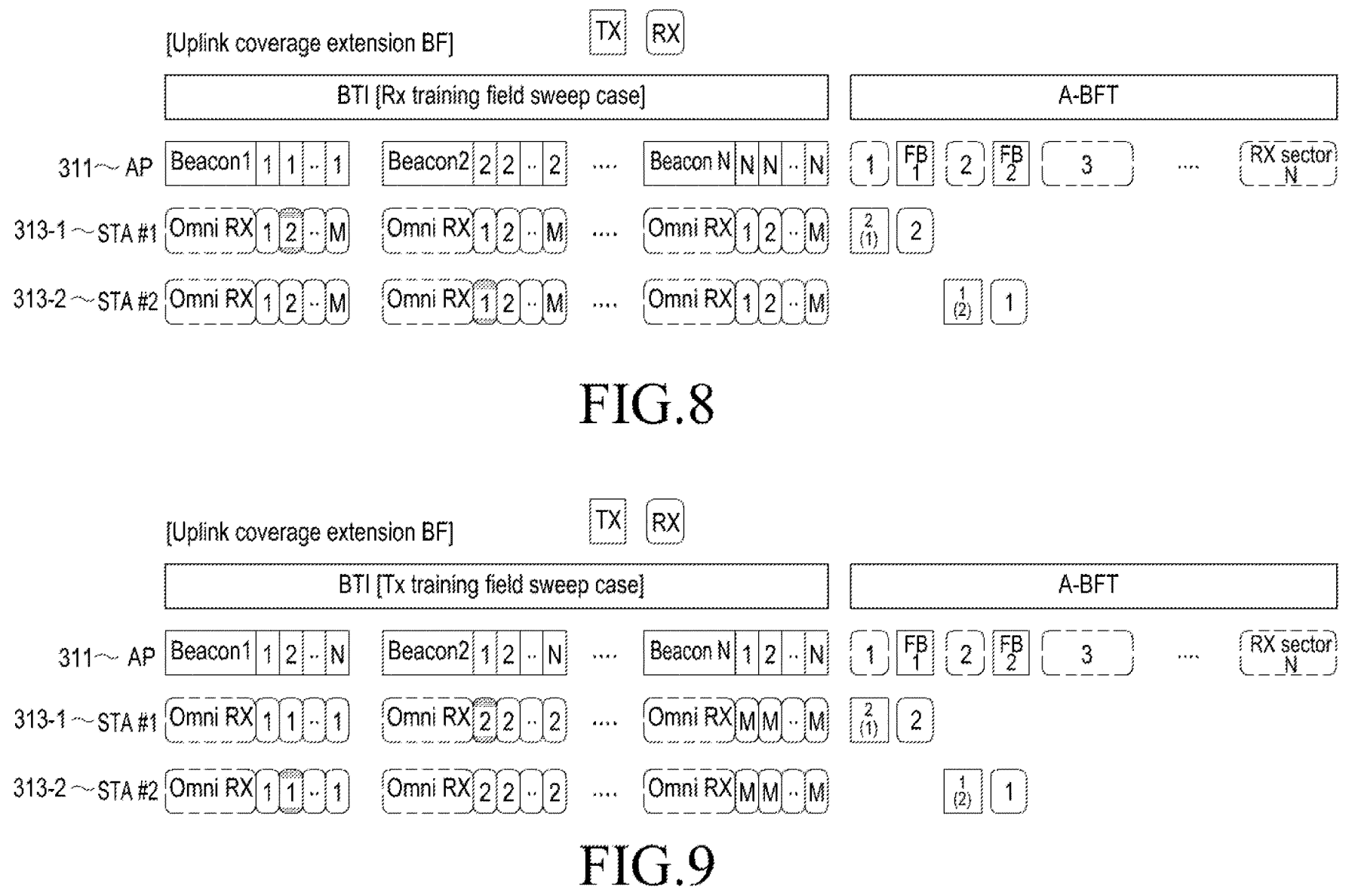

FIG. 8 schematically illustrates an example of an operating process of an AP and an STA during an Ext-BTI in FIG. 3 according to an embodiment of the present disclosure.

Referring to FIG. 8, when transmitting a beacon signal or a training signal, an AP 311 performs an Rx beam searching operation by transmitting a training field at the last part of each frame.

Each of the STA#1 313-1 and the STA#2 313-3 selects an optimal Tx beam pattern of an AP and an optimal Rx beam pattern of an STA at time at which Tx of the beacon signal or the training sequence is terminated.

In FIG. 8, it will be assumed that an optimal Tx beam pattern of the STA#1 313-1 is a Tx beam pattern#2, an optimal Rx beam pattern of the STA#1 313-1 is an Rx beam pattern#2, an optimal Tx beam pattern of the AP 311 for the STA#1 313-1 is a Tx beam pattern#1, and an optimal Rx beam pattern of the AP 311 for the STA#1 313-1 is an Rx beam pattern#1.

In FIG. 8, it will be assumed that an optimal Tx beam pattern of the STA#2 313-2 is a Tx beam pattern#1, an optimal Rx beam pattern of the STA#2 313-2 is an Rx beam pattern#1, an optimal Tx beam pattern of the AP 311 for the STA#2 313-2 is a Tx beam pattern#2, and an optimal Rx beam pattern of the AP 311 for the STA#2 313-2 is an Rx beam pattern#2.

Further, since an STA may determine an optimal Rx beam pattern as an optimal Tx beam pattern of the STA based on a channel reciprocity theory, the STA may transmit a response signal in an Ext-A-BFT interval based on the determined optimal Tx beam pattern.

In an uplink training interval, e.g., in an Ext-A-BFT interval, an AP 311 performs an Rx sector sweep (1~N) operation while changing an Rx beam pattern per predetermined interval. If an interval for changing an Rx sector is relatively long, it is possible for a plurality of STAs to transmit a response signal within the interval.

In the Ext-A-BFT interval, the STA#1 313-1 transmits a response signal in an interval to which an optimal Tx beam pattern and an optimal Rx beam pattern of the AP 311, i.e., a Tx beam pattern#1 and an Rx beam pattern#1 are applied. The reason why the optimal Tx beam pattern of the AP 311 is identical to the optimal Rx beam pattern of the AP 311 is that a channel reciprocity theory is applied. In this case, the STA#1 313-1 transmits a response signal based on an optimal Tx beam pattern#2. The response signal includes information related to the optimal Tx beam pattern/optimal Rx beam pattern of the AP 311.

After receiving the response signal from the STA#1 313-1 in the Ext-A-BFT interval, the AP 311 transmits a FB signal based on an optional Tx beam pattern of the AP 311 corresponding to information related to the optimal Tx beam pattern of the AP 311 included in the response signal. The STA#1 313-1 determines the optimal Tx beam pattern of the AP 311 as the Tx beam pattern#1, so the AP 311 transmits the FB signal based on the Tx beam pattern#1. In this case, the STA#1 313-1 receives the FB signal transmitted in the AP 111 based on an optional Rx beam pattern, i.e., an Rx beam pattern#2.

An example of an operating process of an AP and an STA during an Ext-BTI in FIG. 3 has been described with reference to FIG. 8, and an example of an AP Tx beam training operating process, an operating process of an AP, and an Ext-A-BFT interval operating process during an Ext-BTI in FIG. 3 will be described with reference to FIG. 9.

FIG. 9 schematically illustrates an example of an AP Tx beam training operating process, an operating process of an AP, and an Ext-A-BFT interval operating process during an Ext-BTI in FIG. 3 according to an embodiment of the present disclosure.

Referring to FIG. 9, when transmitting a beacon signal or a training signal, an AP 311 performs a Tx beam searching operation by transmitting a training field at the last part of each frame.

The remaining operation, except for the above operation, is the same as that illustrated in FIG. 8, and thus, a detailed description thereof will be omitted herein.

An example of an AP Tx beam training operating process, an operating process of an AP, and an Ext-A-BFT interval operating process during an Ext-BTI in FIG. 3 has been described with reference to FIG. 9, and another example of an operating process of an AP in a mmWave communication system according to an embodiment of the present disclosure will be described with reference to FIG. 10.

Figure 10:
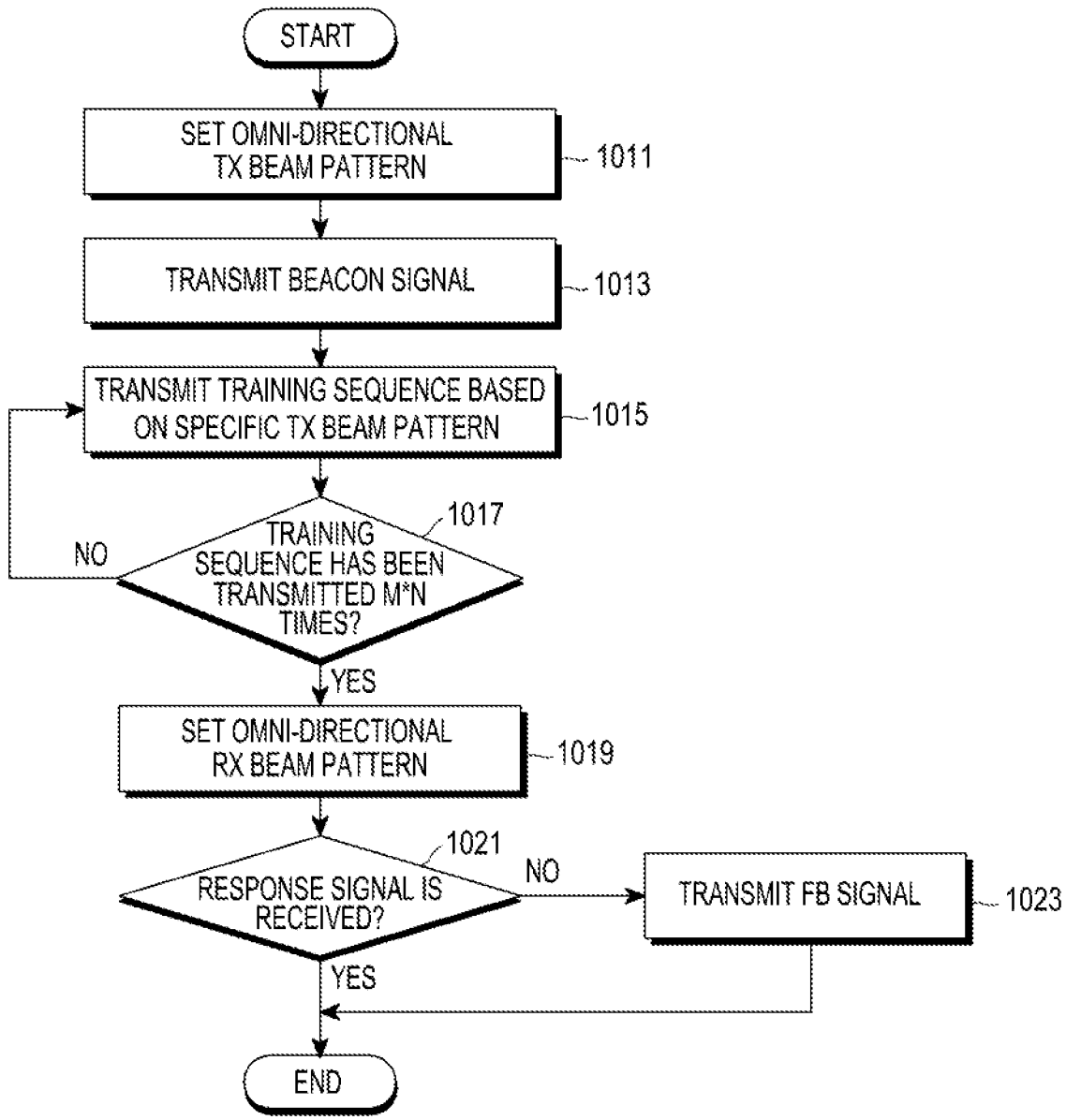
FIG. 10 schematically illustrates another example of an operating process of an AP in a mmWave communication system according to an embodiment of the present disclosure.

FIG. 10 schematically illustrates another example of an operating process of an AP in a mmWave communication system according to an embodiment of the present disclosure.

Referring to FIG. 10, it will be noted that an operating process of an AP in FIG. 10 is an operating process of an AP in a beamforming scheme which is for decreasing network overhead, that is, which is based on training sequence transmission.

Referring to FIG. 10, an AP sets an omni-directional Tx beam pattern at operation 1011. The AP transmits a beacon signal based on the omni-directional Tx beam pattern at operation 1013. The AP repetitively transmits a training sequence based on a specific Tx beam pattern among Tx beam patterns supported in the AP corresponding to a preset count at operation 1015. The AP determines whether the training sequence has been transmitted M times for all of the Tx beam patterns supported in the AP at operation 1017. That is, the AP determines whether the training sequence has been transmitted M*N times. If the training sequence has not been transmitted M times for all of the Tx beam patterns supported in the AP, that is, if there are training sequences to be transmitted, the AP proceeds to operation 1015.

If the training sequence has been transmitted M times for all of the Tx beam patterns supported in the AP, that is, if N*M training sequences have been transmitted, the AP proceeds to operation 1019. The AP sets an omni-directional Rx beam pattern at operation 1019. The AP determines whether a response signal is received from an STA at operation 1021. If the response signal is received from the STA, the AP transmits a FB signal based on a Tx beam pattern which corresponds to the information related to the optional Tx beam pattern of the AP included in the response signal received from the STA at operation 1023.

Although FIG. 10 illustrates another example of an operating process of an AP in a mmWave communication system according to an embodiment of the present disclosure, various changes could be made to FIG. 10. For example, although shown as a series of operations, various operations in FIG. 10 could overlap, occur in parallel, occur in a different order, or occur multiple times.

Another example of an operating process of an AP in a mmWave communication system according to an embodiment of the present disclosure has been described with reference to FIG. 10, and still another example of an operating process of an STA in a mmWave communication system according to an embodiment of the present disclosure will be described with reference to FIG. 11.

Figure 11:
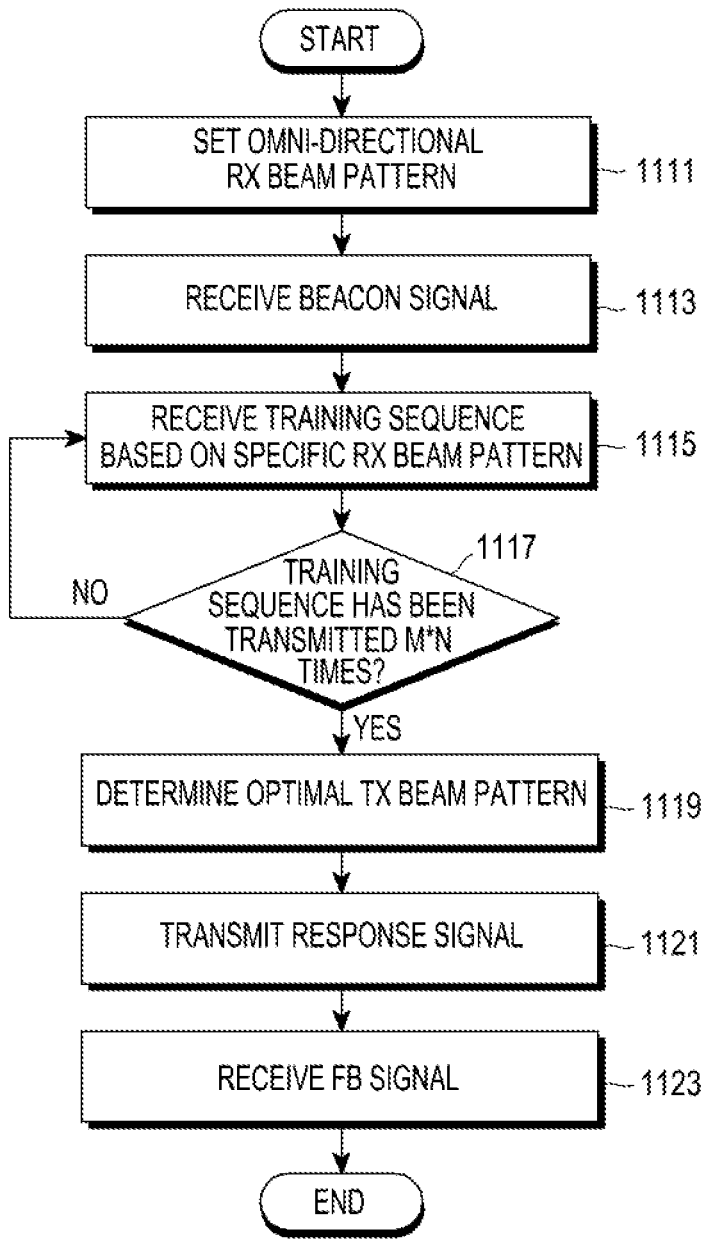
FIG. 11 schematically illustrates still another example of an operating process of an STA in a mmWave communication system according to an embodiment of the present disclosure.

FIG. 11 schematically illustrates still another example of an operating process of an STA in a mmWave communication system according to an embodiment of the present disclosure.

Referring to FIG. 11, it will be noted that an operating process of an STA in FIG. 11 is an operating process of an STA in a beamforming scheme which is for decreasing network overhead, that is, which is based on training sequence transmission.

The STA sets an omni-directional Rx beam pattern at operation 1111. The STA receives a beacon signal based on the omni-directional Rx beam pattern at operation 1113. The STA repetitively receives a training sequence based on a specific Rx beam pattern among Rx beam patterns supported in the STA corresponding to a preset count at operation 1115. The STA determines whether the training sequence has been received N times for all of the Rx beam patterns supported in the STA at operation 1117. That is, the STA determines whether the training sequence has been received M*N times.

If the training sequence has not been received N times for all of the Rx beam patterns supported in the STA, that is, if there are training sequences to be received, the STA proceeds to operation 1115.

If the training sequence has been received N times for all of the Rx beam patterns supported in the STA, the STA proceeds to operation 1119. The STA determines an optimal Tx beam pattern based on the received M*N training sequences at operation 1119. The STA transmits a response signal including information related to the determined optimal Tx beam pattern to the AP at operation 1121. The STA receives a FB signal from the AP at operation 1123.

Although FIG. 11 illustrates still another example of an operating process of an AP in a mmWave communication system according to an embodiment of the present disclosure, various changes could be made to FIG. 11. For example, although shown as a series of operations, various operations in FIG. 11 could overlap, occur in parallel, occur in a different order, or occur multiple times.

Still another example of an operating process of an AP in a mmWave communication system according to an embodiment of the present disclosure has been described with reference to FIG. 11, and other examples of a process of performing a beamforming operation in a mmWave communication system according to an embodiment of the present disclosure will be described with reference to FIGS. 12A and 12B.

Figure 12A:
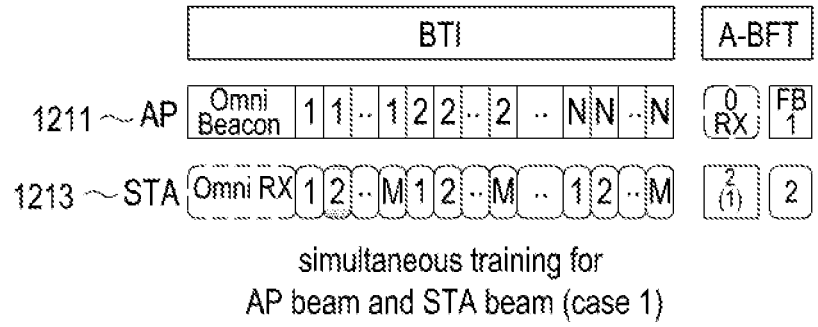
FIGS. 12A and 12B schematically illustrate other examples of a process of performing a beamforming operation in a mmWave communication system according to various embodiments of the present disclosure.
Figure 12B:
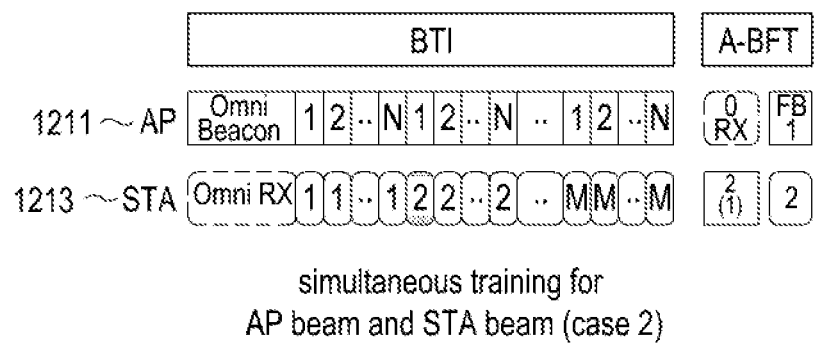

FIGS. 12A and 12B schematically illustrate other examples of a process of performing a beamforming operation in a mmWave communication system according to various embodiments of the present disclosure.

Referring to FIGS. 12A and 12B, it will be assumed that the mmWave communication system is, for example, an IEEE 802.11ad communication system, and this is only an example for convenience of description and should not limit any scope of the present disclosure.

The mmWave communication system includes an AP 1211 and an STA 1213.

The AP 1211 and the STA 1213 perform a beamforming operation based on an BI. An embodiment of the present disclosure proposes a new beamforming procedure and frame structure that enable to decrease network overhead.

As illustrated in FIGS. 12A and 12B, in a mmWave communication system according to various embodiments of the present disclosure, the AP 1211 may perform a Tx beam pattern operation of the AP 1211 and an Rx beam pattern operation of the STA 1213 by transmitting a training field at the last part of each frame when transmitting a beacon signal or a training sequence.

At the time which transmission of the beacon signal or the training sequence is terminated, the STA 1213 selects an optional Tx beam pattern among Tx beam patterns of the AP 1211, and determines an optional Rx beam pattern of the STA 1213.

The STA 1213 may determine the optional Rx beam pattern of the STA 1213 as an optional Tx beam pattern of the STA 1213 based on a channel reciprocity theory, and transmits a response signal to the AP 1211 based on the determined optional Tx beam pattern. In this case, there is no need for a UL training interval. The response signal includes information related to the optional Tx beam pattern of the AP 1211.

The AP 1211 determines an optional Tx beam pattern based on the information related to the optional Tx beam pattern included in the response signal received from the STA 1213, and transmits a FB signal to the response signal based on the optional Tx beam pattern.

Difference between a process of performing a beamforming operation in FIG. 12A and a process of performing a beamforming operation in FIG. 12B is that the AP 1211 repetitively transmits a training sequence once corresponding to a preset count for all of Tx beam patterns supported in the AP 1211 or that the AP 1211 transmits the training sequence once for all of the Tx beam patterns supported in the AP 1211, and transmits the training sequence for all of the Tx beam patterns supported in the AP 1211 until it reaches to the preset count.

A difference between a process of performing a beamforming operation in FIG. 12A and a process of performing a beamforming operation in FIG. 12B is that the STA 1213 repetitively receives a training sequence once corresponding to a preset count for all of Rx beam patterns supported in the STA 1213 or that the STA 1213 receives the training sequence once for all of the Tx beam patterns supported in the STA 1213, and receives the training sequence for all of the Tx beam patterns supported in the STA 1213 until it reaches to the preset count.

Other examples of a process of performing a beamforming operation in a mmWave communication system according to an embodiment of the present disclosure have been described with reference to FIGS. 12A and 12B, and an uplink coverage and downlink coverage environment in a mmWave communication system according to an embodiment of the present disclosure will be described with reference to FIG. 13.

Figure 13:
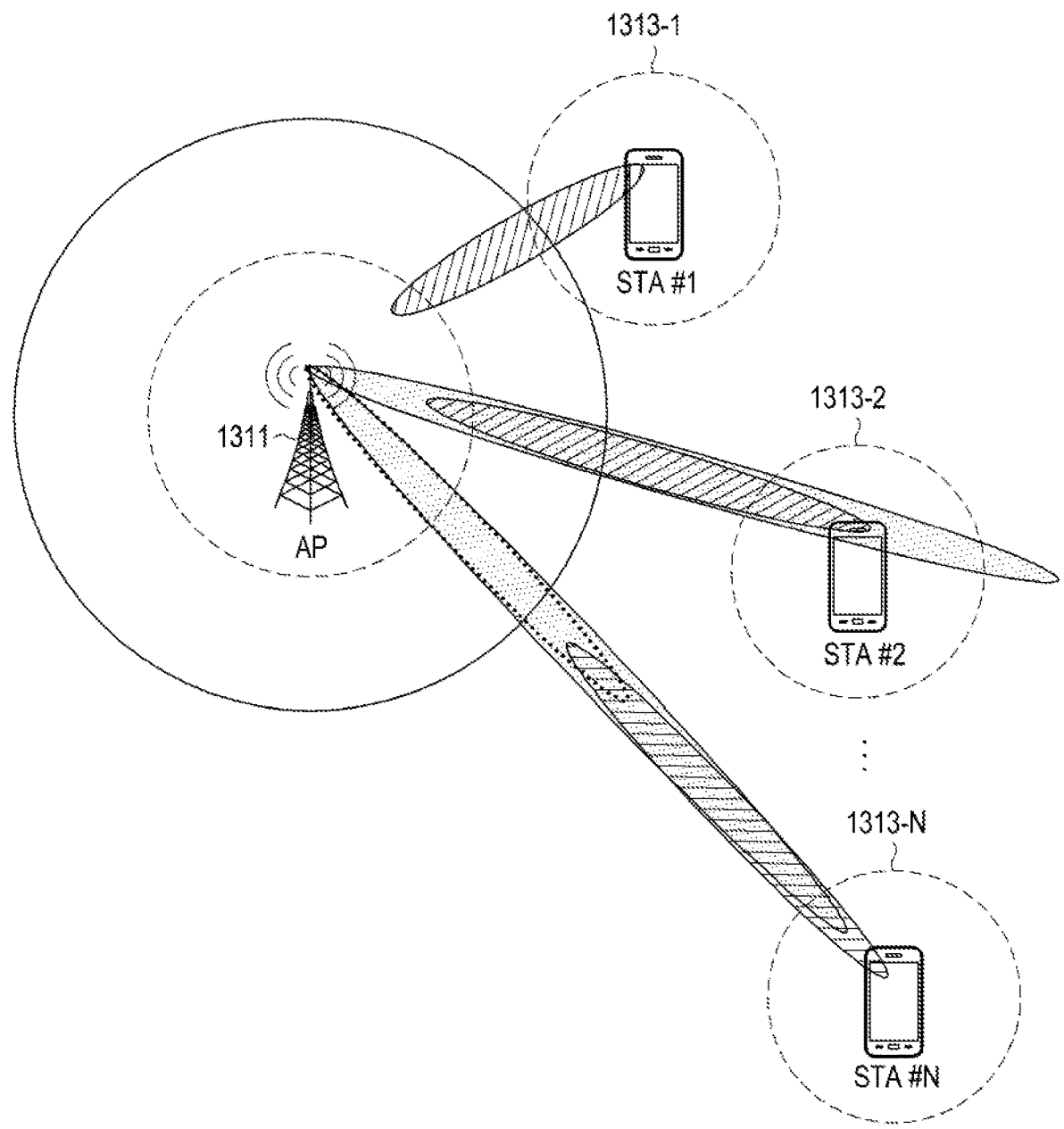
FIG. 13 schematically illustrates an uplink coverage and downlink coverage environment in a mmWave communication system according to an embodiment of the present disclosure.

FIG. 13 schematically illustrates an uplink coverage and downlink coverage environment in a mmWave communication system according to an embodiment of the present disclosure.

Referring to FIG. 13, the mmWave communication system includes an AP 1311, a plurality of STAs, e.g., N STAs, e.g., an STA#1 1313-1, an STA#2 1313-2, ..., an STA#2 1313-N.

As illustrated in FIG. 13, it will be understood that output power of the AP 1311, the STA#1 1313-1, the STA#2 1313-2, ..., the STA#2 1313-N are different. That is, it will be understood that the output power of the AP 1311 is greater than the output power of each of the STA#1 1313-1, the STA#2 1313-2, ..., the STA#2 1313-N.

Link coverage varies according to the difference in the output power, so a mismatch among link coverage, i.e., downlink coverage of the AP 1311 and link coverage, i.e., uplink coverage of the STA#1 1313-1, the STA#2 1313-2, ..., the STA#2 1313-N occurs.

In an embodiment of the present disclosure, a beamforming operation is performed based on link coverage, so network overhead decreases. In an environment where there is a mismatch among downlink coverage and uplink coverage, coverage limitation may be overcome by increasing a beamforming gain a direction of which coverage is small. A process of performing a beamforming operation based on the link coverage has been described with reference to FIGS. 3-11, 12A, and 12B, and thus, a detailed description thereof will be omitted herein.

That is, a stable link may be secured between the AP 1311 and the STA#1 1313-1 using a simplified procedure thereby decreasing the network overhead. In a case that a normal beamforming is performed, it is impossible to establish a link between the AP 1311 and the STA#N 1313-N. However, if a beamforming operation is performed based on a beamforming scheme according to an embodiment of the present disclosure, a stable link may be secured.

An uplink coverage and downlink coverage environment in a mmWave communication system according to an embodiment of the present disclosure has been described with reference to FIG. 13, and link coverage loss due to a decrease of antenna Rx performance in a case that a normal beamforming scheme is used in a general mmWave communication system will be described with reference to FIG. 14.

Figure 14:
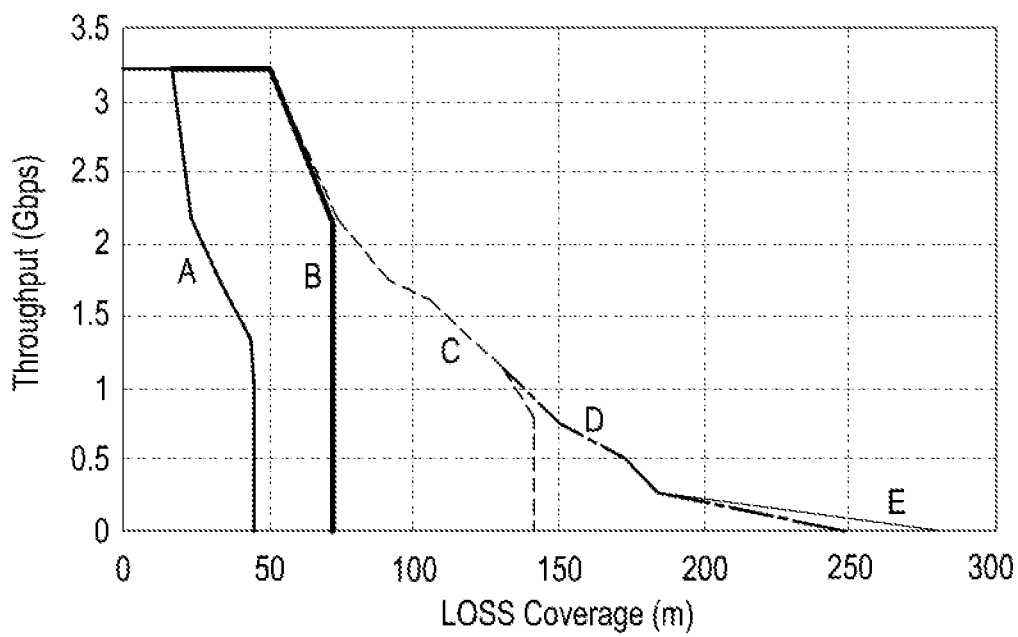
FIG. 14 schematically illustrates link coverage loss due to a decrease of antenna reception (Rx) performance in a case that a normal beamforming scheme is used in a general mmWave communication system according to an embodiment of the present disclosure.

FIG. 14 schematically illustrates link coverage loss due to a decrease of antenna Rx performance in a case that a normal beamforming scheme is used in a general mmWave communication system according to an embodiment of the present disclosure.

Referring to FIG. 14, in a case that a beamforming operation according to a normal beamforming scheme is performed, a direction of an Rx antenna is set to quasi-omni-direction. So, if antenna Rx performance decreases, link coverage loss occurs. The decrease of the antenna Rx performance means that antenna Rx performance decreases compared to antenna Rx performance in a case that a direction of an Rx antenna is directional.

Link coverage loss due to a decrease of antenna Rx performance in a case that a normal beamforming scheme is used in a general mmWave communication system has been described with reference to FIG. 14, and an increase of the network overhead in a case that a normal beamforming scheme is used in a general mmWave communication system will be described with reference to FIG. 15.

Figure 15:
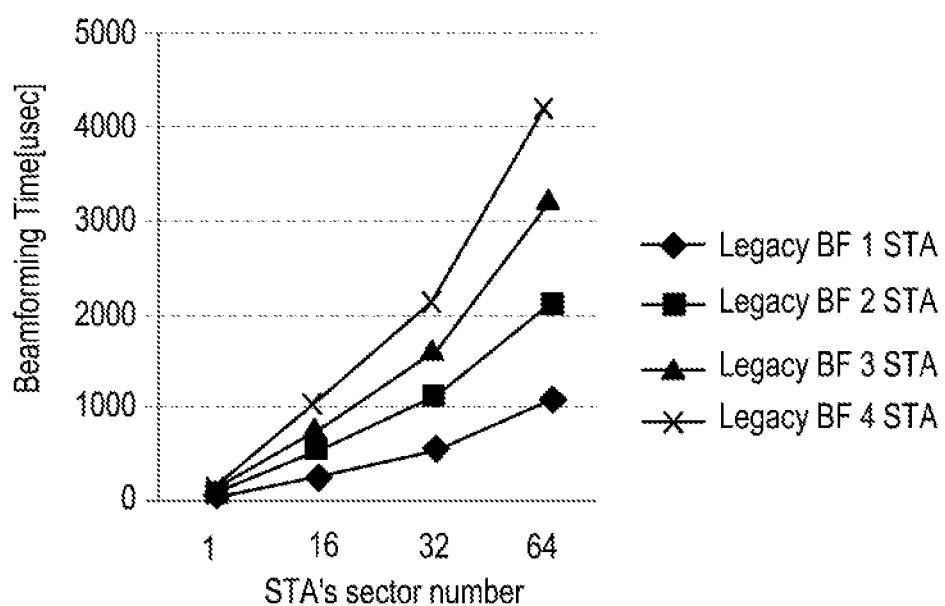
FIG. 15 schematically illustrates an increase of a network overhead in a case that a normal beamforming scheme is used in a general mmWave communication system according to an embodiment of the present disclosure.

FIG. 15 schematically illustrates an increase of a network overhead in a case that a normal beamforming scheme is used in a general mmWave communication system according to an embodiment of the present disclosure.

Referring to FIG. 15, when a beamforming operation according to the normal beamforming scheme is performed, each of an AP and an STA performs a beam training process for performing a beamforming operation, and this beam training process becomes a network overhead interval during which effective data is not transmitted. Finally, increase of this network overhead interval decreases throughput of a network.

In the mmWave communication system, the more increased, the number of beam patterns supported in each of the AP and the STA is, the more increased, a length of a network overhead interval is. The AP performs a beamforming operation with all STAs which access the AP. So, the more increased, the number of the STAs which access the AP is, the more increased, a length of a network overhead interval is. Increase of this network overhead interval results in a decrease in network throughput.

An increase of the network overhead in a case that a normal beamforming scheme is used in a general mmWave communication system has been described with reference to FIG. 15, and a decrease of the network overhead according to the number of beamforming patterns in a case that a beamforming scheme proposed in a mmWave communication system according to an embodiment of the present disclosure is used will be described with reference to FIG. 16.

Figure 16:
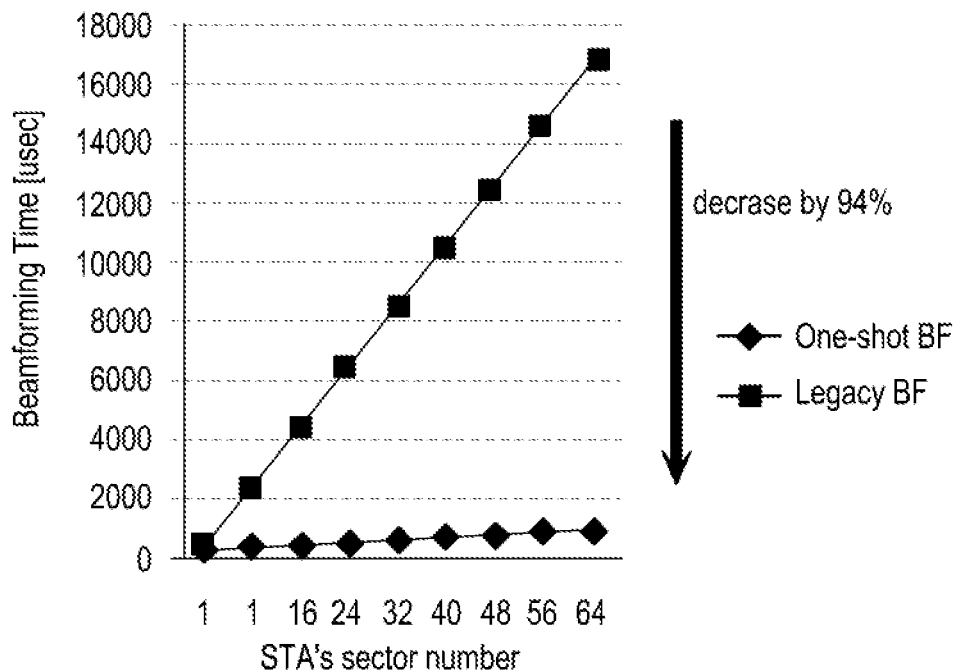
FIG. 16 schematically illustrates a decrease of a network overhead according to the number of beamforming patterns in a case that a beamforming scheme proposed in a mmWave communication system according to an embodiment of the present disclosure is used.

FIG. 16 schematically illustrates a decrease of a network overhead according to the number of beamforming patterns in a case that a beamforming scheme proposed in a mmWave communication system according to an embodiment of the present disclosure is used.

Referring to FIG. 16, in a case that a beamforming scheme according to an embodiment of the present disclosure is used, it will be understood that the network overhead decreases if the number of beamforming patterns supported in an STA is increased, compared to a case that a normal beamforming scheme is used.

In FIG. 16, a graph shown as "One-shot BF" indicates beamforming time according to the number of beamforming patterns supported in an STA in a case that a beamforming scheme according to an embodiment of the present disclosure is used. In FIG. 16, a graph shown as "Legacy BF" indicates beamforming time according to the number of beamforming patterns supported in an STA in a case that a normal beamforming scheme is used. In FIG. 16, a graph shown as "STA's sector number" indicates the number of beamforming patterns supported in an STA.

A decrease of the network overhead according to the number of beamforming patterns in a case that a beamforming scheme proposed in a mmWave communication system according to an embodiment of the present disclosure is used has been described with reference to FIG. 16, and an increase of the uplink coverage in a case that a beamforming scheme proposed in a mmWave communication system according to an embodiment of the present disclosure is used will be described with reference to FIG. 17.

Figure 17:
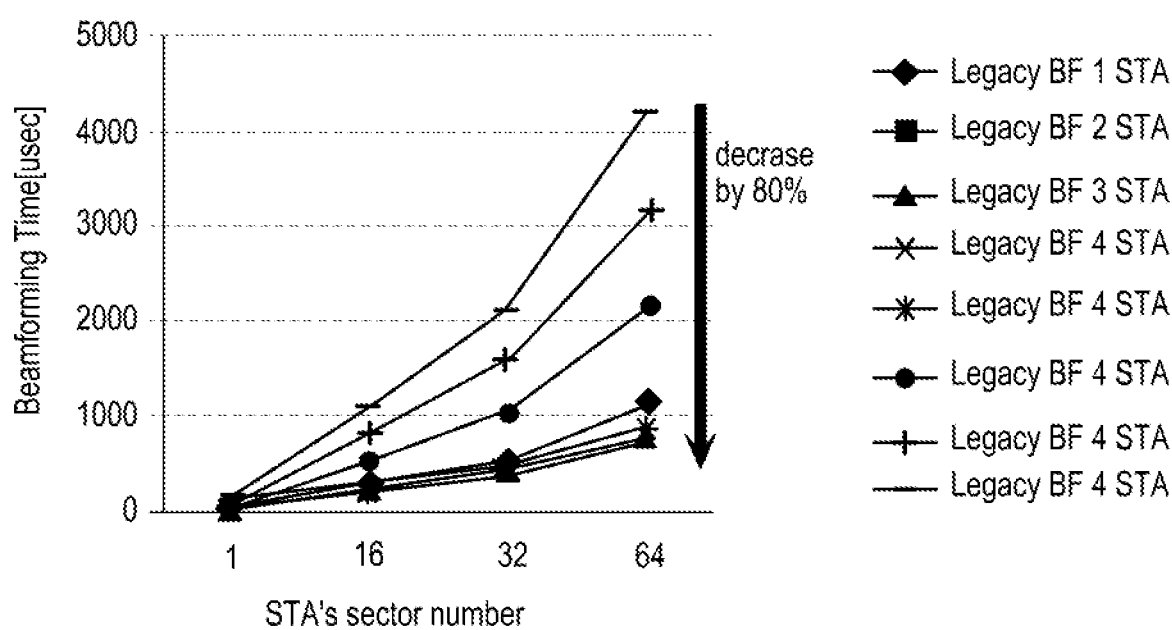
FIG. 17 schematically illustrates an increase of an uplink coverage in a case that a beamforming scheme proposed in a mmWave communication system according to an embodiment of the present disclosure.

FIG. 17 schematically illustrates an increase of the uplink coverage in a case that a beamforming scheme proposed in a mmWave communication system according to an embodiment of the present disclosure.

Referring to FIG. 17, in a case that a beamforming scheme according to an embodiment of the present disclosure is used, it will be understood that the network overhead decreases if the number of STAs which access an AP increases, compared to a case that a normal beamforming scheme is used.

In FIG. 17, a graph shown as "One-shot BF" indicates beamforming time according to the number of STAs which access an AP which will use a beamforming scheme according to an embodiment of the present disclosure. In FIG. 17 a graph shown as "Legacy BF" indicates beamforming time according to the number of STAs which access an AP in a case that a normal beamforming scheme is used. In FIG. 17 a graph shown as "STA's sector number" indicates the number of beamforming patterns supported in an STA.

An increase of an uplink coverage in a case that a beamforming scheme proposed in a mmWave communication system according to an embodiment of the present disclosure is used has been described with reference to FIG. 17, and an inner structure of an AP in a mmWave communication system according to an embodiment of the present disclosure will be described with reference to FIG. 18.

Figure 18:
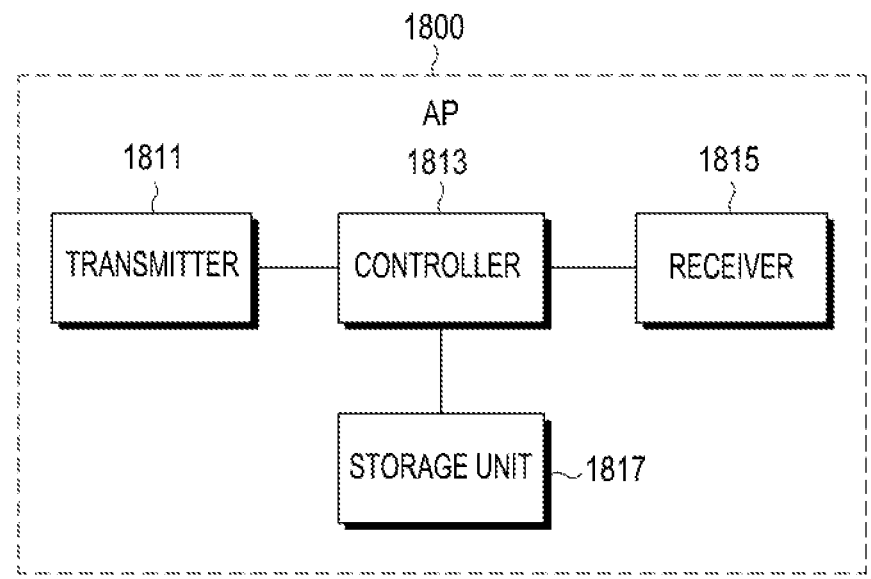
FIG. 18 schematically illustrates an inner structure of an AP in a mmWave communication system according to an embodiment of the present disclosure.

FIG. 18 schematically illustrates an inner structure of an AP in a mmWave communication system according to an embodiment of the present disclosure.

Referring to FIG. 18, an AP 1800 includes a transmitter 1811, a controller (e.g., at least one computer processor) 1813, a receiver 1815, and a storage unit 1817.

The controller 1813 controls the overall operation of the AP 1800. More particularly, the controller 1813 controls an operation related to an operation of performing a beamforming operation which is based on a beamforming scheme according to an embodiment of the present disclosure. The operation related to the operation of performing the beamforming operation which is based on the beamforming scheme according to an embodiment of the present disclosure has been described with reference to FIGS. 3-11, 12A, and 12B, and a detailed description thereof will be omitted herein.

The transmitter 1811 transmits various signals and various messages to other entities, e.g., an STA, and/or the like included in the mmWave communication system under a control of the controller 1813. The various signals and various messages transmitted in the transmitter 1811 have been described with reference to FIGS. 3-11, 12A, and 12B, and a detailed description thereof will be omitted herein.

The receiver 1815 receives various signals and various messages from other entities, e.g., an STA and/or the like included in the mmWave communication system under a control of the controller 1813. The various signals and various messages received in the receiver 1815 have been described with reference to FIGS. 3-11, 12A, and 12B, and a detailed description thereof will be omitted herein.

The storage unit 1817 stores various programs, various data, and/or the like related to the operation related to the operation of performing the beamforming operation which is based on the beamforming scheme according to an embodiment of the present disclosure under a control of the controller 1813.

The storage unit 1817 stores various signals and various messages which are received by the receiver 1815 from the other entities.

While the transmitter 1811, the controller 1813, the receiver 1815, and the storage unit 1817 are described in the AP 1800 as separate units, it is to be understood that this is merely for convenience of description. In other words, two or more of the transmitter 1811, the controller 1813, the receiver 1815, and the storage unit 1817 may be incorporated into a single unit.

The AP 1800 may be implemented with one processor (e.g., computer processor).

An inner structure of an AP in a mmWave communication system according to an embodiment of the present disclosure has been described with reference to FIG. 18, and an inner structure of an STA in a mmWave communication system according to an embodiment of the present disclosure will be described with reference to FIG. 19.

Figure 19:
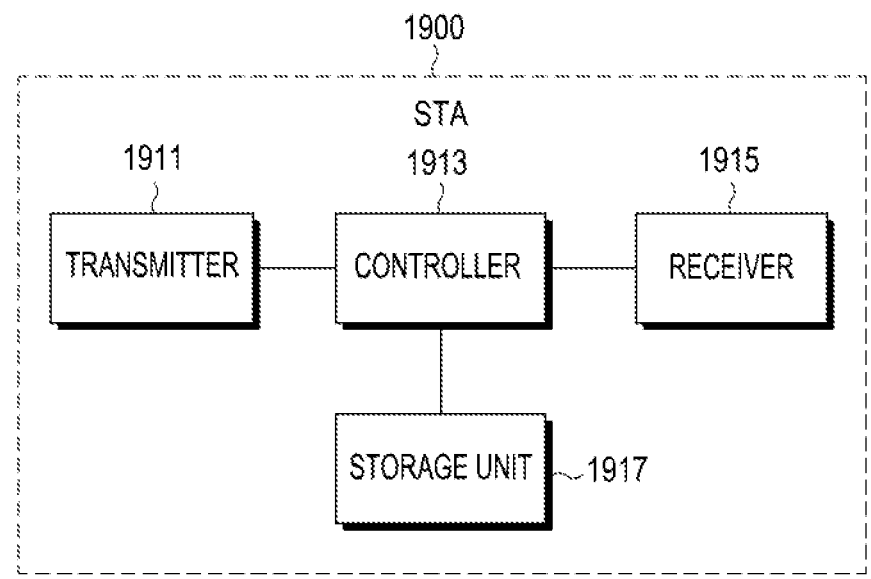
FIG. 19 schematically illustrates an inner structure of an STA in a mmWave communication system according to an embodiment of the present disclosure.

FIG. 19 schematically illustrates an inner structure of an STA in a mmWave communication system according to an embodiment of the present disclosure.

Referring to FIG. 19, an STA 1900 includes a transmitter 1911, a controller (e.g., at least one computer processor) 1913, a receiver 1915, and a storage unit 1917.

The controller 1913 controls the overall operation of the STA 1900. More particularly, the controller 1913 controls an operation related to an operation of performing a beamforming operation which is based on a beamforming scheme according to an embodiment of the present disclosure. The operation related to the operation of performing the beamforming operation which is based on the beamforming scheme according to an embodiment of the present disclosure has been described with reference to FIGS. 3-11, 12A, and 12B, and a detailed description thereof will be omitted herein.

The transmitter 1911 transmits various signals and various messages to other entities, e.g., an AP, and/or the like included in the mmWave communication system under a control of the controller 1913. The various signals and various messages transmitted in the transmitter 1911 have been described with reference to FIGS. 3-11, 12A, and 12B, and a detailed description thereof will be omitted herein.

The receiver 1915 receives various signals and various messages from other entities, e.g., an AP and/or the like included in the mmWave communication system under a control of the controller 1913. The various signals and various messages received in the receiver 1915 have been described with reference to FIGS. 1-11, 12A, and 12B, and a detailed description thereof will be omitted herein.

The storage unit 1917 stores various programs, various data, and/or the like related to the operation related to the operation of performing the beamforming operation which is based on the beamforming scheme according to an embodiment of the present disclosure under a control of the controller 1913.

The storage unit 1917 stores the various signals and various messages which are received by the receiver 1915 from the other entities.

While the transmitter 1911, the controller 1913, the receiver 1915, and the storage unit 1917 are described in the STA 1900 as separate units, it is to be understood that this is merely for convenience of description. In other words, two or more of the transmitter 1911, the controller 1913, the receiver 1915, and the storage unit 1917 may be incorporated into a single unit.

The STA 1900 may be implemented with one processor.

In accordance with various embodiments of the present disclosure, a method for performing a beamforming operation in an access point (AP) in a millimeter Wave (mmWave) communication system is provided. The method includes transmitting a directional reference signal (RS) in an RS transmission (Tx) interval based on beamforming patterns supported in the AP, and transmitting a training signal in an interval different from an interval during which the directional RS is transmitted in the RS Tx interval based on beamforming patterns supported in the AP, wherein a length of the training signal is shorter than a length of the directional RS.

Preferably, the transmitting of the training signal in the interval different from the interval during which the directional RS is transmitted in the RS Tx interval based on the beamforming patterns supported in the AP comprises repetitively transmitting the training signal based on each of the beamforming patterns supported in the AP corresponding to a preset count.

Preferably, the transmitting of the training signal in the interval different from the interval during which the directional RS is transmitted in the RS Tx interval based on the beamforming patterns supported in the AP comprises repetitively performing an operation of transmitting the training signal once based on all of the beamforming patterns supported in the AP corresponding to a preset count.

Preferably, the directional RS includes at least one of Tx antenna gain information and Rx antenna gain (RX ANT GAIN) information.

Preferably, the method further includes receiving, from a station (STA), a response signal including information related to an optimal Tx beam pattern of the AP which is determined by the STA after transmitting the training signal.

Preferably, the method further includes determining an optimal Tx beam pattern of the AP to be applied to the STA corresponding to the information related to the optimal Tx beam pattern and transmitting a feedback signal in response to the response signal based on the determined optional Tx beam pattern.

In accordance with various embodiments of the present disclosure, a method for performing a beamforming operation in a STA in an mmWave communication system is provided. The method includes receiving a directional RS in an RS Tx interval; and receiving a training signal in an interval different from an interval during which the directional RS is received in the RS Tx interval based on beamforming patterns supported in the STA, wherein a length of the training signal is shorter than a length of the directional RS.

Preferably, the receiving of the training signal in the interval different from the interval during which the directional RS is received in the RS Tx interval based on the beamforming patterns supported in the STA comprises repetitively receiving the training signal based on each of the beamforming patterns supported in the STA corresponding to a preset count.

Preferably, the receiving of the training signal in the interval different from the interval during which the directional RS is received in the RS Tx interval based on the beamforming patterns supported in the STA comprises repetitively performing an operation of receiving the training signal once based on all of the beamforming patterns supported in the STA corresponding to a preset count.

Preferably, the directional RS includes at least one of Tx antenna gain information and Rx antenna gain information.

Preferably, the method further includes transmitting, to an AP, a response signal including information related to an optimal Tx beam pattern of the AP which is determined by the STA after receiving the training signal.

Preferably, the method further includes receiving, from the AP, a feedback signal in response to the response signal.

In accordance with various embodiments of the present disclosure, an AP in a mmWave communication system is provided. The AP includes a transmitter configured to perform an operation of transmitting a directional RS in an RS Tx interval based on beamforming patterns supported in the AP, and perform an operation of transmitting a training signal in an interval different from an interval during which the directional RS is transmitted in the RS Tx interval based on beamforming patterns supported in the AP, wherein a length of the training signal is shorter than a length of the directional RS.

Preferably, the operation of transmitting the training signal in the interval different from the interval during which the directional RS is transmitted in the RS Tx interval based on the beamforming patterns supported in the AP comprises an operation of repetitively transmitting the training signal based on each of the beamforming patterns supported in the AP corresponding to a preset count.

Preferably, the operation of transmitting the training signal in the interval different from the interval during which the directional RS is transmitted in the RS Tx interval based on the beamforming patterns supported in the AP comprises an operation of repetitively performing an operation of transmitting the training signal once based on all of the beamforming patterns supported in the AP corresponding to a preset count.

Preferably, the directional RS includes at least one of Tx antenna gain information and RX ANT GAIN information.

Preferably, the AP further includes a receiver configured to receive, from a STA, a response signal including information related to an optimal Tx beam pattern of the AP which is determined by the STA.

Preferably, the AP further includes a controller (e.g., at least one computer processor) configured to determine an optimal Tx beam pattern of the AP to be applied to the STA corresponding to the information related to the optimal Tx beam pattern, wherein the transmitter transmits a feedback signal in response to the response signal based on the determined optional Tx beam pattern.

In accordance with various embodiments of the present disclosure, a STA in a mmWave communication system is provided. The STA includes a receiver configured to perform an operation of receiving a directional RS in an RS Tx interval, and perform an operation of receiving a training signal in an interval different from an interval during which the directional RS is received in the RS Tx interval based on beamforming patterns supported in the STA, wherein a length of the training signal is shorter than a length of the directional RS.

Preferably, the operation of receiving the training signal in the interval different from the interval during which the directional RS is received in the RS Tx interval based on the beamforming patterns supported in the STA comprises an operation of repetitively receiving the training signal based on each of the beamforming patterns supported in the STA corresponding to a preset count.

Preferably, the operation of receiving the training signal in the interval different from the interval during which the directional RS is received in the RS Tx interval based on the beamforming patterns supported in the STA comprises an operation of repetitively performing an operation of receiving the training signal once based on all of the beamforming patterns supported in the STA corresponding to a preset count.

Preferably, the directional RS includes at least one of Tx antenna gain information and RX ANT GAIN information.

Preferably, the STA further includes a transmitter configured to transmit, to an AP, a response signal including information related to an optimal Tx beam pattern of the AP which is determined by the STA after receiving the training signal.

Preferably, the receiver receives, from the AP, a feedback signal in response to the response signal.

As is apparent from the foregoing description, an embodiment of the present disclosure enables a performance of a beamforming operation in a mmWave communication system.

An embodiment of the present disclosure enables a performance of a beamforming operation based on link coverage in a mmWave communication system.

An embodiment of the present disclosure enables a performance of a beamforming operation based on a network overhead in a mmWave communication system.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital versatile disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing a beamforming operation in an access point (AP) in a millimeter Wave (mmWave) communication system, the method comprising:
   selecting a first beamforming scheme from a plurality of different beamforming schemes;
   transmitting, to a station (STA), an omni-directional reference signal (RS) in an RS transmission (Tx) interval of the first beamforming scheme;
   transmitting, to the STA, a training signal in an interval different from an interval during which the omni-directional RS is transmitted in the RS Tx interval of the first beamforming scheme, based on beamforming patterns;
   receiving, from the STA, a response signal including information related to a Tx beam pattern of the STA which is determined, by the STA, based on the omni-directional RS and the training signal;
   determining a Tx beam pattern of the AP based on the information related to the Tx beam pattern of the STA; and
   transmitting, to the STA, a feedback signal in response to the response signal based on the determined Tx beam pattern of the AP,
   wherein a length of the training signal is shorter than a length of the omni-directional RS.

2. The method of claim 1, wherein the transmitting of the training signal in the interval different from the interval during which the omni-directional RS is transmitted in the RS Tx interval of the first beam forming scheme based on the beamforming patterns further comprises:
   repetitively transmitting the training signal based on each of the beamforming patterns corresponding to a preset count.

3. The method of claim 1, wherein the transmitting of the training signal in the interval different from the interval during which the omni-directional RS is transmitted in the RS Tx interval of the first beam forming scheme based on the beamforming patterns further comprises:
repetitively performing an operation of transmitting the training signal once, based on all of the beamforming patterns corresponding to a preset count.

4. The method of claim 1, wherein the Tx beam pattern of the STA is determined, by the STA, based on a result of a beam sweeping process for each Tx antenna.

5. A method for performing a beamforming operation in a station (STA) in a millimeter Wave (mmWave) communication system, the method comprising:
receiving, from an access point (AP), an omni-directional reference signal (RS) in an RS transmission (Tx) interval according to a first beamforming scheme selected from a plurality of beamforming schemes;
receiving, from the AP, a training signal in an interval different from an interval during which the omni-directional RS is received in the RS Tx interval of the first beamforming scheme, based on beamforming patterns;
determining a Tx beam pattern of STA based on the omni-directional RS and the training signal;
transmitting, to the AP, a response signal including information related to the Tx beam pattern of the STA; and
receiving, from the AP, a feedback signal in response to the response signal,
wherein the feedback signal is transmitted based on a Tx beam pattern of the AP which is determined, by the AP, based on the information related to the Tx beam pattern of the STX, and
wherein a length of the training signal is shorter than a length of the omni-directional RS.

6. The method of claim 5, wherein the receiving of the training signal in the interval different from the interval during which the omni-directional RS is received in the RS Tx interval according to the first beamforming scheme based on the beamforming patterns further comprises:
repetitively receiving the training signal based on each of the beamforming patterns corresponding to a preset count.

7. The method of claim 5, wherein the receiving of the training signal in the interval different from the interval during which the omni-directional RS is received in the RS Tx interval according to the first beamforming scheme based on the beamforming patterns further comprises:
repetitively performing an operation of receiving the training signal once based on all of the beamforming patterns corresponding to a preset count.

8. The method of claim 5, wherein the Tx beam pattern of the STA is determined, by the STA, based on a result of a beam sweeping process for each Tx antenna.

9. An access point (AP) in a millimeter Wave (mmWave) communication system, the AP comprising:
a transceiver; and
at least one processor configured to:
select a first beamforming scheme from a plurality of different beamforming schemes,
control the transceiver to transmit, to a station (STA), an omni-directional reference signal (RS) in an RS transmission (Tx) interval of the first beamforming scheme,
control the transceiver to transmit, to the STA, a training signal in an interval different from an interval during which the omni-directional RS is transmitted in the RS Tx interval of the first beamforming scheme, based on beamforming patterns,
control the transceiver to receive, from the STA, a response signal including information related to a Tx beam pattern of the STA which is determined, by the STA, based on the omni-directional RS and the training signal,
determine a Tx beam pattern of the AP based on the information related to the Tx beam pattern of the STA, and
control the transceiver to transmit, to the STA, a feedback signal in response to the response signal based on the determined Tx beam pattern of the AP,
wherein a length of the training signal is shorter than a length of the omni-directional RS.

10. The AP of claim 9, wherein the at least one processor is further configured to control the transceiver to repetitively transmit the training signal based on each of the beamforming patterns corresponding to a preset count.

11. The AP of claim 9, wherein the at least one processor is further configured to repetitively perform an operation of transmitting the training signal once based on all of the beamforming patterns corresponding to a preset count.

12. The AP of claim 9, wherein the Tx beam pattern of the STA is determined, by the STA, based on a result of a beam sweeping process for each Tx antenna.

13. A station (STA) in a millimeter Wave (mmWave) communication system, the STA comprising:
a transceiver; and
at least one processor configured to:
control the transceiver to receive, from an access point (AP), an omni-directional reference signal (RS) in an RS transmission (Tx) interval according to a first beamforming scheme selected from a plurality of beamforming schemes,
control the transceiver to receive, from the AP, a training signal in an interval different from an interval during which the omni-directional RS is received in the RS Tx interval of the first beamforming scheme, based on beamforming patterns,
determine a Tx beam pattern of STA based on the omni-directional RS and the training signal,
control the transceiver to transmit, to the AP, a response signal including information related to the Tx beam pattern of the STX, and
control the transceiver to receive, from the AP, a feedback signal in response to the response signal,
wherein the feedback signal is transmitted based on a Tx beam pattern of the AP which is determined, by the AP, based on the information related to the Tx beam pattern of the STA, and
wherein a length of the training signal is shorter than a length of the omni-directional RS.

14. The STA of claim 13, wherein, to control the transceiver to receive the training signal in the interval different from the interval during which the omni-directional RS is received in the RS Tx interval according to the first beamforming scheme based on the beamforming patterns, the at least one processor is further configured to:
control the transceiver to repetitively receive the training signal based on each of the beamforming patterns corresponding to a preset count.

15. The STA of claim 13, wherein, to control the transceiver to receive the training signal in the interval different from the interval during which the omni-directional RS is received in the RS Tx interval according to the first beamforming scheme based on the beamforming patterns, the at least one processor is further configured to:

control the transceiver to repetitively receive the training signal once based on all of the beamforming patterns corresponding to a preset count.

16. The STA of claim 13, wherein the Tx beam pattern of the STA is determined, by the STA, based on a result of a beam sweeping process for each Tx antenna.

17. The method of claim 1, wherein the plurality of different beamforming schemes includes at least three different beamforming schemes.

18. The method of claim 17, wherein the at least three different beamforming schemes comprises a beam transmission scheme, an omni-directional beam transmission scheme, and an extended-beam transmission scheme.

* * * * *